(12) United States Patent  (10) Patent No.: US 12,439,177 B2
Lebrun et al.  (45) Date of Patent: Oct. 7, 2025

(54) FLARE COMPENSATION

(71) Applicant: GoPro, Inc., San Mateo, CA (US)

(72) Inventors: Marc Lebrun, Issy-les-Moulineaux (FR); Eric Chasseur, Le Pecq (FR)

(73) Assignee: GoPro, Inc., San Mateo, CA (US)

(*) Notice: Subject to any disclaimer, the term of this patent is extended or adjusted under 35 U.S.C. 154(b) by 130 days.

(21) Appl. No.: 18/392,833

(22) Filed: Dec. 21, 2023

(65) Prior Publication Data
US 2025/0211872 A1 Jun. 26, 2025

(51) Int. Cl.
H04N 25/61 (2023.01)
G06T 5/50 (2006.01)
G06T 5/70 (2024.01)
G06T 7/90 (2017.01)
H04N 23/88 (2023.01)

(52) U.S. Cl.
CPC ............ H04N 25/61 (2023.01); G06T 5/50 (2013.01); G06T 5/70 (2024.01); G06T 7/90 (2017.01); H04N 23/88 (2023.01); G06T 2207/10024 (2013.01)

(58) Field of Classification Search
CPC ...... H04N 25/61; H04N 23/45; H04N 23/698; H04N 23/90
USPC ........................................................ 348/241
See application file for complete search history.

(56) References Cited

U.S. PATENT DOCUMENTS

| 10,382,712 B1* | 8/2019 | Forutanpour | .......... H04N 23/80 |
| 10,630,921 B2 | 4/2020 | Douady-Pleven | |
| 11,330,208 B2 | 5/2022 | Douady-Pleven | |
| 11,503,232 B2 | 11/2022 | Matthieu | |
| 2009/0002529 A1 | 1/2009 | Shurboff | |
| 2009/0060369 A1 | 3/2009 | Agarwala | |
| 2011/0242352 A1 | 10/2011 | Hikosaka | |
| 2012/0147213 A1 | 6/2012 | Dalton | |
| 2013/0329132 A1* | 12/2013 | Tico | .......... G06T 7/11 348/222.1 |
| 2014/0320715 A1 | 10/2014 | Haji-Khamneh | |
| 2015/0103181 A1 | 4/2015 | Mou | |
| 2015/0146014 A1* | 5/2015 | Black | .......... G06T 5/94 348/222.1 |
| 2015/0365576 A1 | 12/2015 | Wang | |
| 2017/0070689 A1 | 3/2017 | Silverstein | |
| 2017/0094169 A1 | 3/2017 | Yoshikawa | |

(Continued)

FOREIGN PATENT DOCUMENTS

WO 2014042104 A1 3/2014

OTHER PUBLICATIONS

International Preliminary Report on Patentability for Application No. PCT/US2019/020241, date of mailing Dec. 3, 2020, 8 pages.

(Continued)

Primary Examiner — Anthony J Daniels
(74) Attorney, Agent, or Firm — Young Basile Hanlon & MacFarlane, P.C.

(57) ABSTRACT

A flare value is estimated for a color channel using downscaled images of images obtained via dual fisheye lenses. The flare value is adjusted based on at least one of luminance exposure compensation (LEC) or automatic color lens shading (ACLS) data to obtain an adjusted flare value. Flare in the color channel of at least one of the images is corrected by combining the adjusted flare value with pixel values of the at least one of the images.

20 Claims, 14 Drawing Sheets

(56) References Cited

U.S. PATENT DOCUMENTS

| | | |
|---|---|---|
| 2017/0243373 A1 | 8/2017 | Bevensee |
| 2017/0359534 A1 | 12/2017 | Li |
| 2019/0260978 A1 | 8/2019 | Matthieu |
| 2019/0356873 A1 | 11/2019 | Douady-Pleven |
| 2020/0244901 A1 | 7/2020 | Douady-Pleven |
| 2022/0053153 A1 | 2/2022 | Guérin |
| 2023/0044846 A1 | 2/2023 | Guérin |

OTHER PUBLICATIONS

International Search Report and Written Opinion for Application No. PCT/US2019/020241, date of mailing Jun. 3, 2019, 12 pages.

* cited by examiner

FLARE COMPENSATION

TECHNICAL FIELD

The present disclosure relates to digital image and video processing, including temporal and spatial image noise reduction, local motion compensation, spatially combining images, image distortion compensation, bitrate allocation, image alignment, prevention of highlight clipping, and reduction in lens flare.

BACKGROUND

In the field of photography and digital imaging, a common issue encountered is the presence of lens flare in captured images. This phenomenon, typically manifested as a visible artifact, arises due to light scattering within the lens system, often as a result of a bright light source, such as the sun artificial lighting. Lens flare is generally considered undesirable as it can obscure details, reduce contrast, and affect the overall quality of the image. It can appear as a haze across the image, or as discrete, brightly colored shapes, often in a streak or halo pattern.

SUMMARY

Disclosed herein are implementations of flare compensation.

A first aspect of the disclosed implementations is a method that includes estimating a flare value for a color channel using downscaled images of images obtained via dual fisheye lenses; adjusting the flare value based on at least one of luminance exposure compensation (LEC) or automatic color lens shading (ACLS) data to obtain an adjusted flare value; and correcting a flare in the color channel of at least one of the images by combining the adjusted flare value with pixel values of the at least one of the images.

A second aspect of the disclosed implementations is an apparatus that includes a processor. The processor is configured to execute instructions to identify overlapping bands about a stitch line between a first downscaled image of a first image and a second downscaled image of a second image based on ring grid coordinates; reduce the overlapping bands to respective one-dimensional lines of pixel values for at least one color channel; estimate a flare value for the at least one color channel based on offsets between corresponding pixel values of the respective one-dimensional lines; and correct pixel values of the at least one color channel of a raw image corresponding to one of the first downscaled image or the second downscaled image based on the flare value.

A third aspect of the disclosed implementations is a non-transitory computer readable medium that stores instructions operable to cause one or more processors to perform operations to estimate respective flare values for color channels using downscaled images obtained from a white balancing step of an image signal processing pipeline; adjust one of the respective flare values based on at least one of luminance exposure compensation (LEC) or automatic color lens shading (ACLS) data to obtain respective adjusted flare values; and correct a flare in at least one of the color channels based on a corresponding adjusted flare value of the respective adjusted flare values by combining the corresponding adjusted flare value with pixel values of a raw image corresponding to at least one of the downscaled images.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the methods and/or techniques disclosed herein. Aspects can be combined such that features described in the context of one aspect may be implemented in another aspect.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Lens flare is an optical phenomenon that occurs when light is scattered or flared in a lens system, often in response to bright light sources, resulting in a degradation of image contrast and brightness. This scattering is typically caused by the interaction of light with the lens elements and internal surfaces of the camera's optics. The manifestation of lens flare varies, but it commonly appears as a haze across the image and/or as visible artifacts (e.g., rings, stars, or streaks of light), which can be undesired in photography as they can obscure detail and alter color fidelity.

When dealing with dual fisheye lenses, as often used in 360-degree cameras, the flare can be more complex and challenging to manage (e.g., estimate and correct). Each lens can capture light sources from various angles, leading to multiple flare occurrences that can overlap or interact in the merged image. Moreover, in a dual fisheye setup, where images from both lenses are stitched together to create a full 360-degree view, managing flare becomes critical. Flare can cause discrepancies in brightness and color between the two images, complicating the stitching process and potentially leading to visible seams or mismatches in the final composite image. The overlapping regions captured by both lenses can exhibit different flare characteristics, making it essential to employ advanced flare estimation and correction techniques to ensure a seamless and realistic 360-degree image.

Implementations according to this disclosure perform flare compensation in digital imaging, particularly for raw images. In some implementations, flare is estimated and corrected in images. In some implementations, flare is estimated, the estimated flare is adjusted, and then the flare is corrected. The flare estimate is a value that is subtracted from one of the front or back images. The sign of the flare estimate can be used to determine whether the magnitude of the flare estimate is to be subtracted from the front or the back images. To be more specific, the flare estimate is in fact one flare estimate value per color channel.

Figure 6:
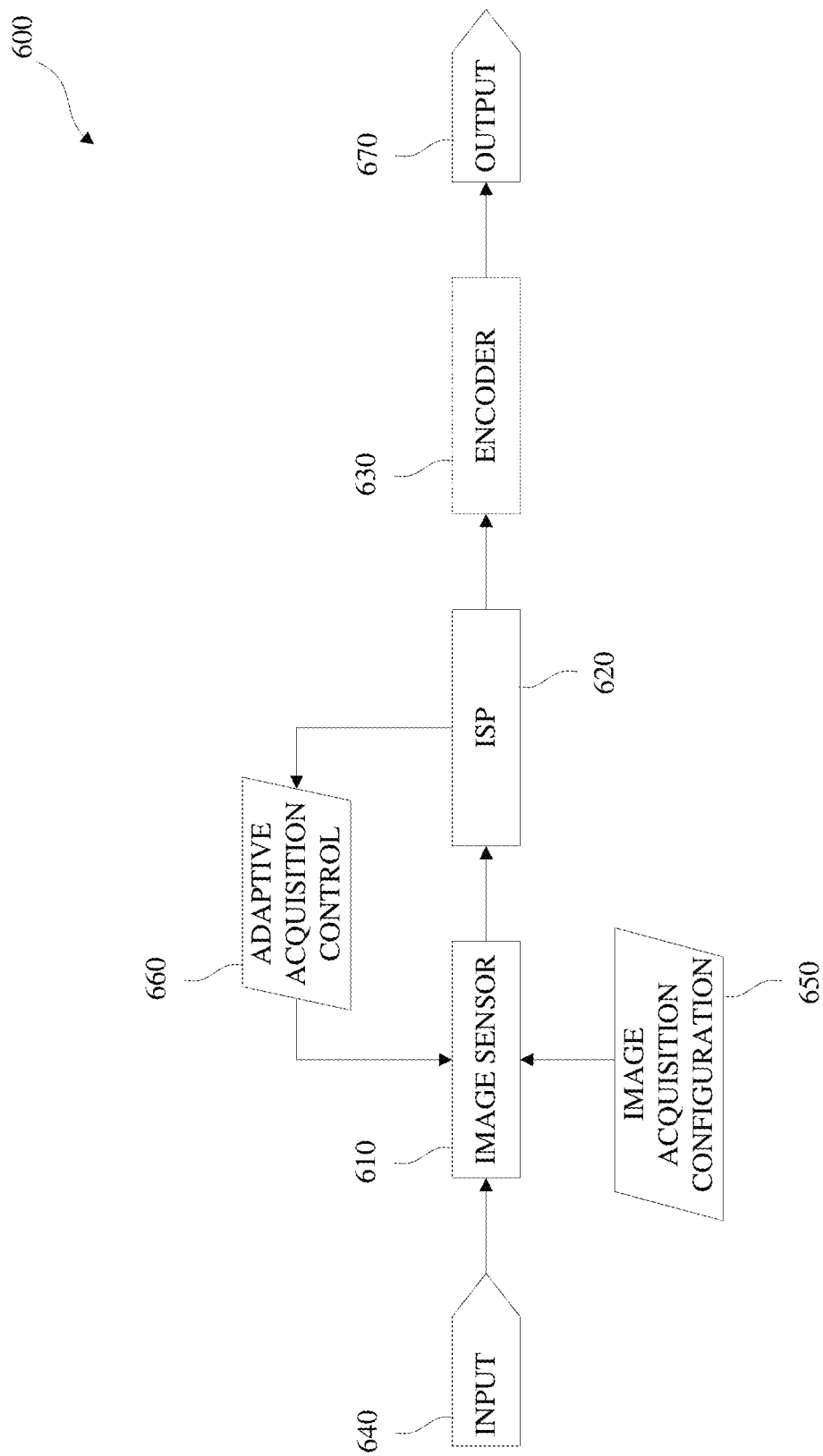
FIG. 6 is a flow diagram of an example of an image processing pipeline.

Flare estimation can be performed on full images or on downscaled image statistics from an Automatic White Balance (AWB) algorithm, or any other processing step or block described with respect to the image signal processor of FIG. 6, focusing on overlapping bands from dual fisheye lenses to identify flare. To refine the flare estimate, auto color lens shading (ACLS) data, exposure and gain data, luminance lens shading (LLS), luminance exposure compensation (LEC) data, and the dark corners are examined and white balance scales are considered. To correct the flare on a color channel, the estimated flare value for that color is subtracted from an image (i.e., from the pixels of the image), with special considerations for preserving color accuracy and avoiding crushing dark areas. Crushing dark areas, in this context, means excessively darkening the shadowed or lower-light portions of an image to the extent that details and textures within these areas are lost, resulting in those regions appearing uniformly black or nearly black without any visible differentiation or detail.

Figure 1A:
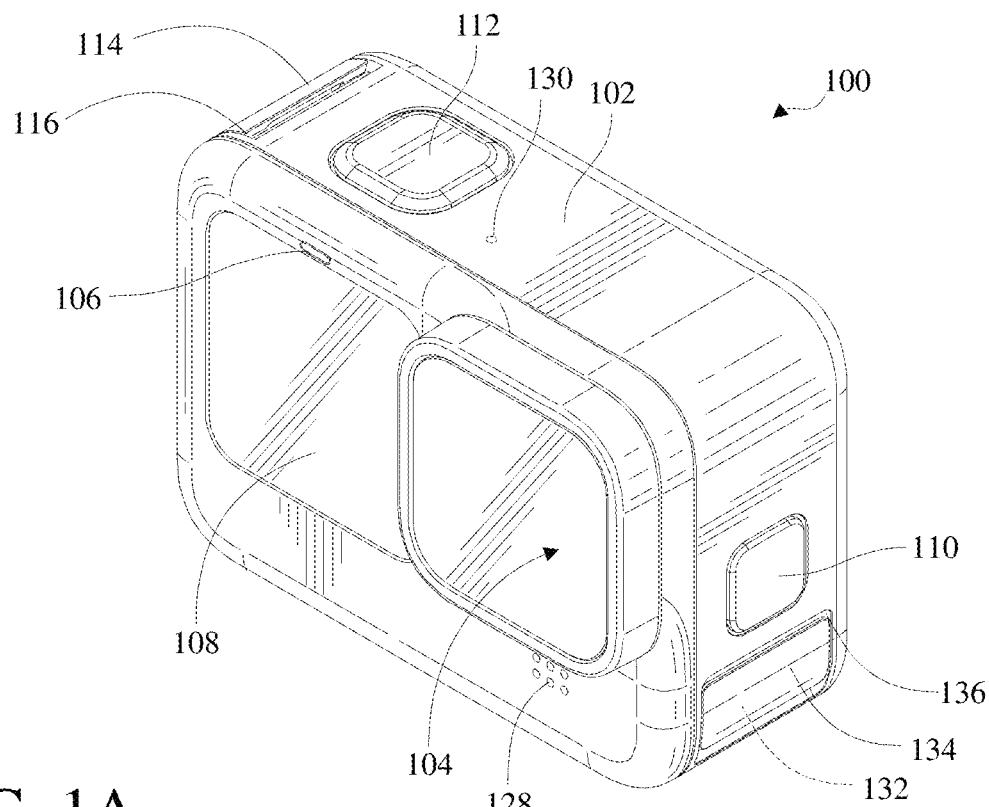
FIGS. 1A-1B are isometric views of an example of an image capture apparatus.
Figure 1B:
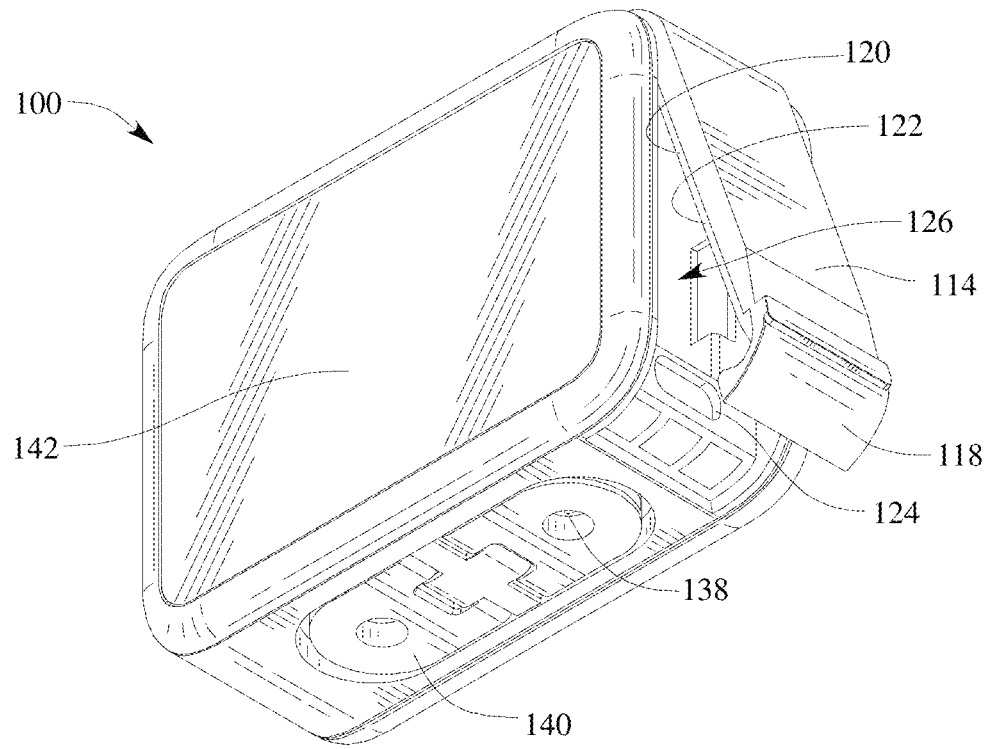
Figure 5:
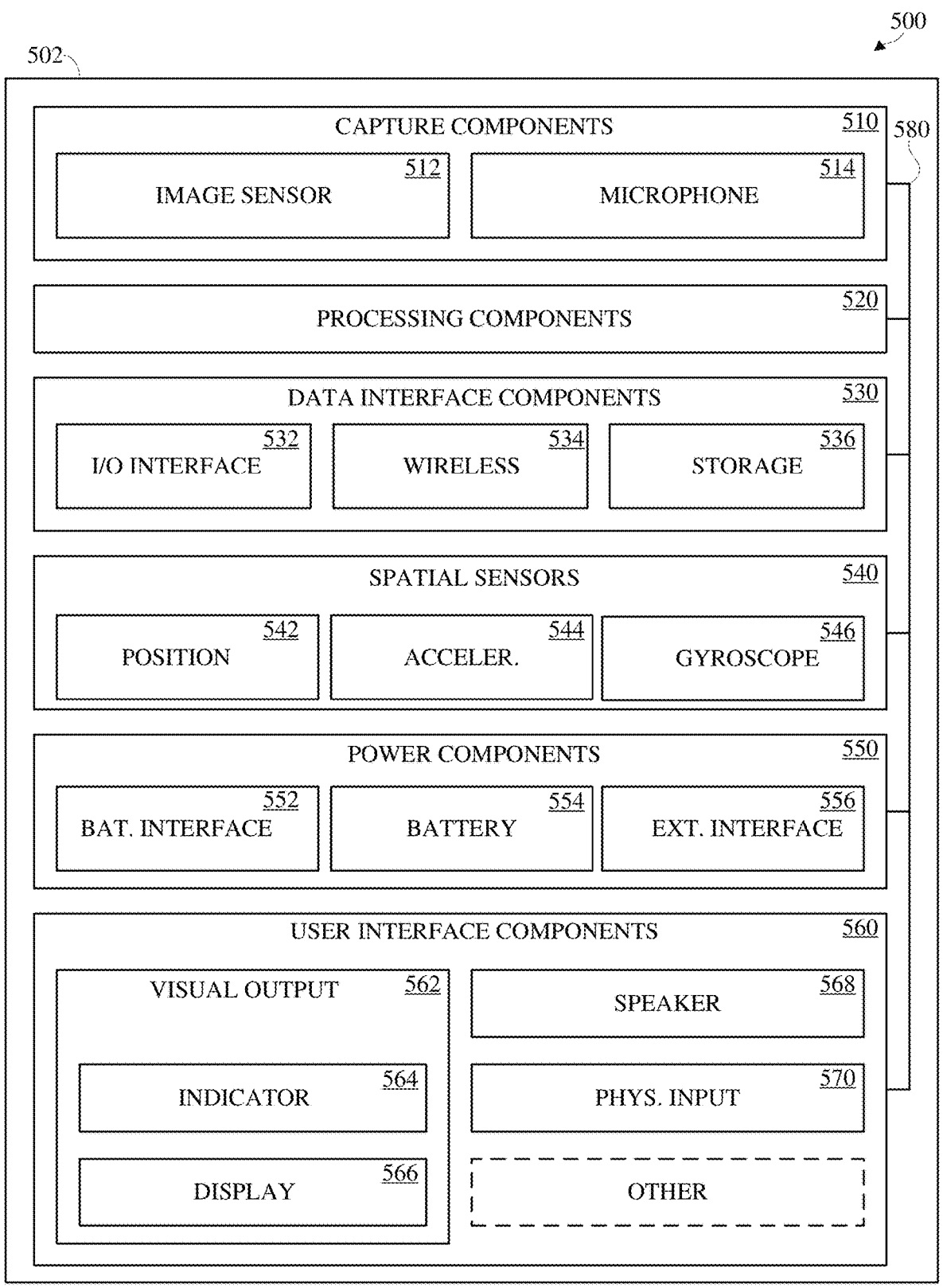
FIG. 5 is a block diagram of electronic components of an image capture apparatus.

FIGS. 1A-1B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 138, an interconnect mechanism 140, and a display 142. Although not expressly shown in FIGS. 1A-1B, the image capture apparatus 100 includes internal electronics, such as imaging electronics, power electronics, and the like, internal to the body 102 for capturing images and performing other functions of the image capture apparatus 100. An example showing internal electronics is shown in FIG. 5. The arrangement of the components of the image capture apparatus 100 shown in FIGS. 1A-1B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used. The image capture device 104 is structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. In some implementations, the display 108 may be omitted or combined with another component of the image capture apparatus 100.

As shown in FIG. 1A, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1A, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. The shutter button 112 may be another type of input device, such as a switch, a toggle, a slider, or a dial. The image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1B, the image capture apparatus 100 includes the door 114 coupled to the body 102, such as using the hinge mechanism 116 (FIG. 1A). The door 114 may be secured to the body 102 using the latch mechanism 118 that releasably engages the body 102 at a position generally opposite the hinge mechanism 116. The door 114 includes the seal 120 and the battery interface 122. Although one door 114 is shown in FIG. 1A, the image capture apparatus 100 may include multiple doors respectively forming respective surfaces of the body 102, or portions thereof. The door 114 may be removable from the body 102 by releasing the latch mechanism 118 from the body 102 and decoupling the hinge mechanism 116 from the body 102.

In FIG. 1B, the door 114 is shown in a partially open position such that the data interface 124 is accessible for communicating with external devices and the battery receptacle 126 is accessible for placement or replacement of a battery. In FIG. 1A, the door 114 is shown in a closed position. In implementations in which the door 114 is in the closed position, the seal 120 engages a flange (not shown) to provide an environmental seal and the battery interface 122 engages the battery (not shown) to secure the battery in the battery receptacle 126.

As shown in FIG. 1B, the image capture apparatus 100 includes the battery receptacle 126 structured to form a portion of an interior surface of the body 102. The battery receptacle 126 includes operative connections for power transfer between the battery and the image capture apparatus 100. In some implementations, the battery receptacle 126 may be omitted. The image capture apparatus 100 may include multiple battery receptacles.

As shown in FIG. 1A, the image capture apparatus 100 includes a first microphone 128 structured on a front surface of the body 102, a second microphone 130 structured on a top surface of the body 102, and a third microphone 132 structured on a side surface of the body 102. The third microphone 132, which may be referred to as a drain microphone and is indicated as hidden in dotted line, is located behind a drain cover 134, surrounded by a drain channel 136, and can drain liquid from audio components of the image capture apparatus 100. The image capture apparatus 100 may include other microphones on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 138 structured on a bottom surface of the body 102. The speaker 138 outputs or presents audio, such as by playing back recorded audio or emitting sounds associated with notifications. The image capture apparatus 100 may include multiple speakers structured on respective surfaces of the body 102.

As shown in FIG. 1B, the image capture apparatus 100 includes the interconnect mechanism 140 structured on a bottom surface of the body 102. The interconnect mechanism 140 removably connects the image capture apparatus 100 to an external structure, such as a handle grip, another mount, or a securing device. The interconnect mechanism 140 includes folding protrusions configured to move between a nested or collapsed position as shown in FIG. 1B and an extended or open position. The folding protrusions of the interconnect mechanism 140 in the extended or open position may be coupled to reciprocal protrusions of other devices such as handle grips, mounts, clips, or like devices. The image capture apparatus 100 may include multiple interconnect mechanisms structured on, or forming a portion of, respective surfaces of the body 102. In some implementations, the interconnect mechanism 140 may be omitted.

As shown in FIG. 1B, the image capture apparatus 100 includes the display 142 structured on, and forming a portion of, a rear surface of the body 102. The display 142 outputs, such as presents or displays, such as by emitting visible light, data, such as to show image information such as image previews, live video capture, or status information such as battery life, camera mode, elapsed time, and the like. In some implementations, the display 142 may be an interactive display, which may receive, detect, or capture input, such as user input representing user interaction with the image capture apparatus 100. The image capture apparatus 100 may include multiple displays structured on respective surfaces of the body 102, such as the displays 108, 142 shown in FIGS. 1A-1B. In some implementations, the display 142 may be omitted or combined with another component of the image capture apparatus 100.

The image capture apparatus 100 may include features or components other than those described herein, such as other buttons or interface features. In some implementations, interchangeable lenses, cold shoes, and hot shoes, or a combination thereof, may be coupled to or combined with the image capture apparatus 100. For example, the image capture apparatus 100 may communicate with an external device, such as an external user interface device, via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link.

The external device may store, process, display, or combination thereof, the images. The external user interface device may be a computing device, such as a smartphone, a tablet computer, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 2A:
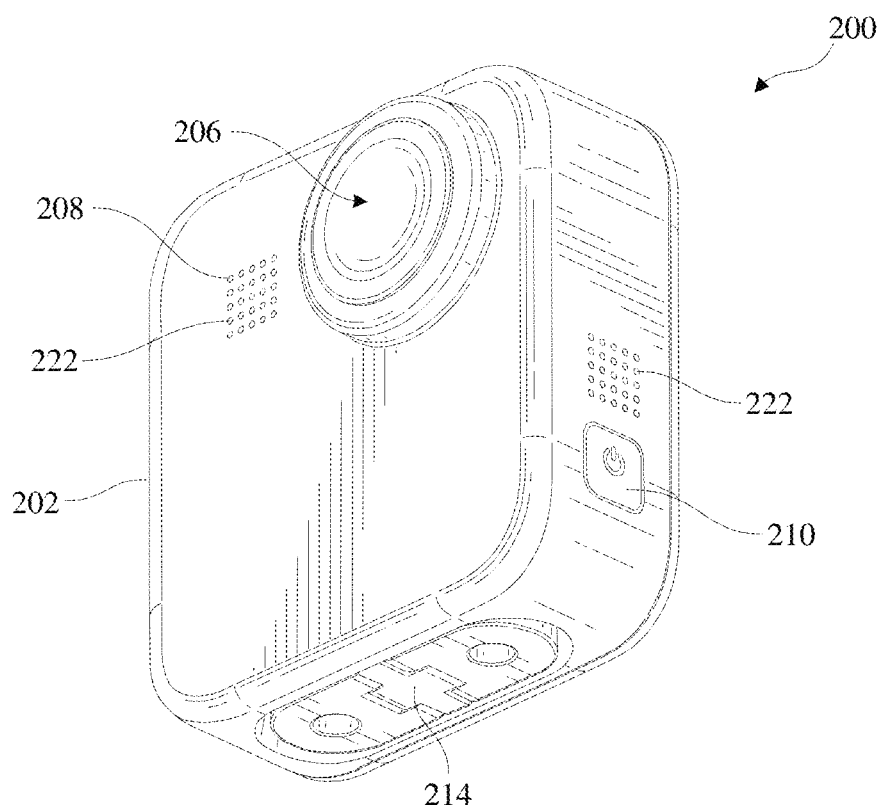
FIGS. 2A-2B are isometric views of another example of an image capture apparatus.
Figure 2B:
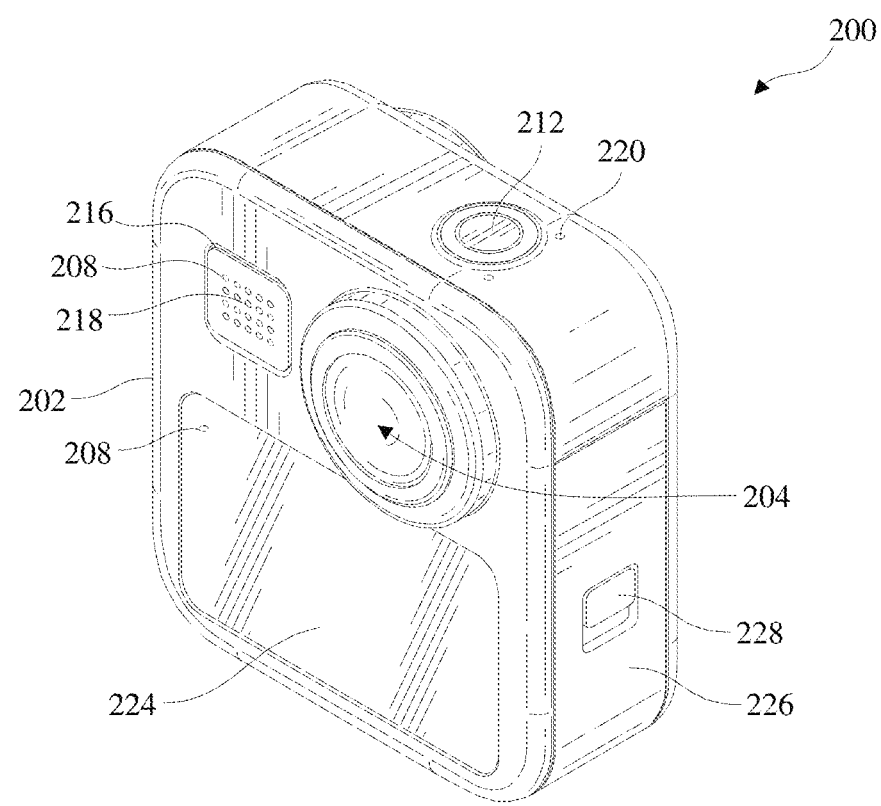

FIGS. 2A-2B illustrate another example of an image capture apparatus 200. The image capture apparatus 200 is similar to the image capture apparatus 100 shown in FIGS. 1A-1B. The image capture apparatus 200 includes a body 202, a first image capture device 204, a second image capture device 206, indicators 208, a mode button 210, a shutter button 212, an interconnect mechanism 214, a drainage channel 216, audio components 218, 220, 222, a display 224, and a door 226 including a release mechanism 228. The arrangement of the components of the image capture apparatus 200 shown in FIGS. 2A-2B is an example, other arrangements of elements may be used.

The body 202 of the image capture apparatus 200 may be similar to the body 102 shown in FIGS. 1A-1B. The first image capture device 204 is structured on a front surface of the body 202. The first image capture device 204 includes a first lens. The first image capture device 204 may be similar to the image capture device 104 shown in FIG. 1A. As shown in FIG. 2A, the image capture apparatus 200 includes the second image capture device 206 structured on a rear surface of the body 202. The second image capture device 206 includes a second lens. The second image capture device 206 may be similar to the image capture device 104 shown in FIG. 1A. The image capture devices 204, 206 are disposed on opposing surfaces of the body 202, for example, in a back-to-back configuration, Janus configuration, or offset Janus configuration. The image capture apparatus 200 may include other image capture devices structured on respective surfaces of the body 202.

As shown in FIG. 2B, the image capture apparatus 200 includes the indicators 208 associated with the audio component 218 and the display 224 on the front surface of the body 202. The indicators 208 may be similar to the indicator 106 shown in FIG. 1A. For example, one of the indicators 208 may indicate a status of the first image capture device 204 and another one of the indicators 208 may indicate a status of the second image capture device 206. Although two indicators 208 are shown in FIGS. 2A-2B, the image capture apparatus 200 may include other indictors structured on respective surfaces of the body 202.

As shown in FIGS. 2A-2B, the image capture apparatus 200 includes input mechanisms including the mode button 210, structured on a side surface of the body 202, and the shutter button 212, structured on a top surface of the body 202. The mode button 210 may be similar to the mode button 110 shown in FIG. 1B. The shutter button 212 may be similar to the shutter button 112 shown in FIG. 1A.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 5.

As shown in FIGS. 2A-2B, the image capture apparatus 200 includes the interconnect mechanism 214 structured on a bottom surface of the body 202. The interconnect mechanism 214 may be similar to the interconnect mechanism 140 shown in FIG. 1B.

As shown in FIG. 2B, the image capture apparatus 200 includes the drainage channel 216 for draining liquid from audio components of the image capture apparatus 200.

As shown in FIGS. 2A-2B, the image capture apparatus 200 includes the audio components 218, 220, 222, respectively structured on respective surfaces of the body 202. The audio components 218, 220, 222 may be similar to the microphones 128, 130, 132 and the speaker 138 shown in FIGS. 1A-1B. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts.

As shown in FIGS. 2A-2B, a first audio component 218 is located on a front surface of the body 202, a second audio component 220 is located on a top surface of the body 202, and a third audio component 222 is located on a back surface of the body 202. Other numbers and configurations for the audio components 218, 220, 222 may be used. For example, the audio component 218 may be a drain microphone surrounded by the drainage channel 216 and adjacent to one of the indicators 208 as shown in FIG. 2B.

As shown in FIG. 2B, the image capture apparatus 200 includes the display 224 structured on a front surface of the body 202. The display 224 may be similar to the displays 108, 142 shown in FIGS. 1A-1B. The display 224 may include an I/O interface. The display 224 may include one or more of the indicators 208. The display 224 may receive touch inputs. The display 224 may display image information during video capture. The display 224 may provide status information to a user, such as status information indicating battery power level, memory card capacity, time elapsed for a recorded video, etc. The image capture apparatus 200 may include multiple displays structured on respective surfaces of the body 202. In some implementations, the display 224 may be omitted or combined with another component of the image capture apparatus 200.

As shown in FIG. 2B, the image capture apparatus 200 includes the door 226 structured on, or forming a portion of, the side surface of the body 202. The door 226 may be similar to the door 114 shown in FIG. 1A. For example, the door 226 shown in FIG. 2A includes a release mechanism 228. The release mechanism 228 may include a latch, a button, or other mechanism configured to receive a user input that allows the door 226 to change position. The release mechanism 228 may be used to open the door 226 for a user to access a battery, a battery receptacle, an I/O interface, a memory card interface, etc.

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable lenses, cold shoes, or hot shoes.

Figure 3:
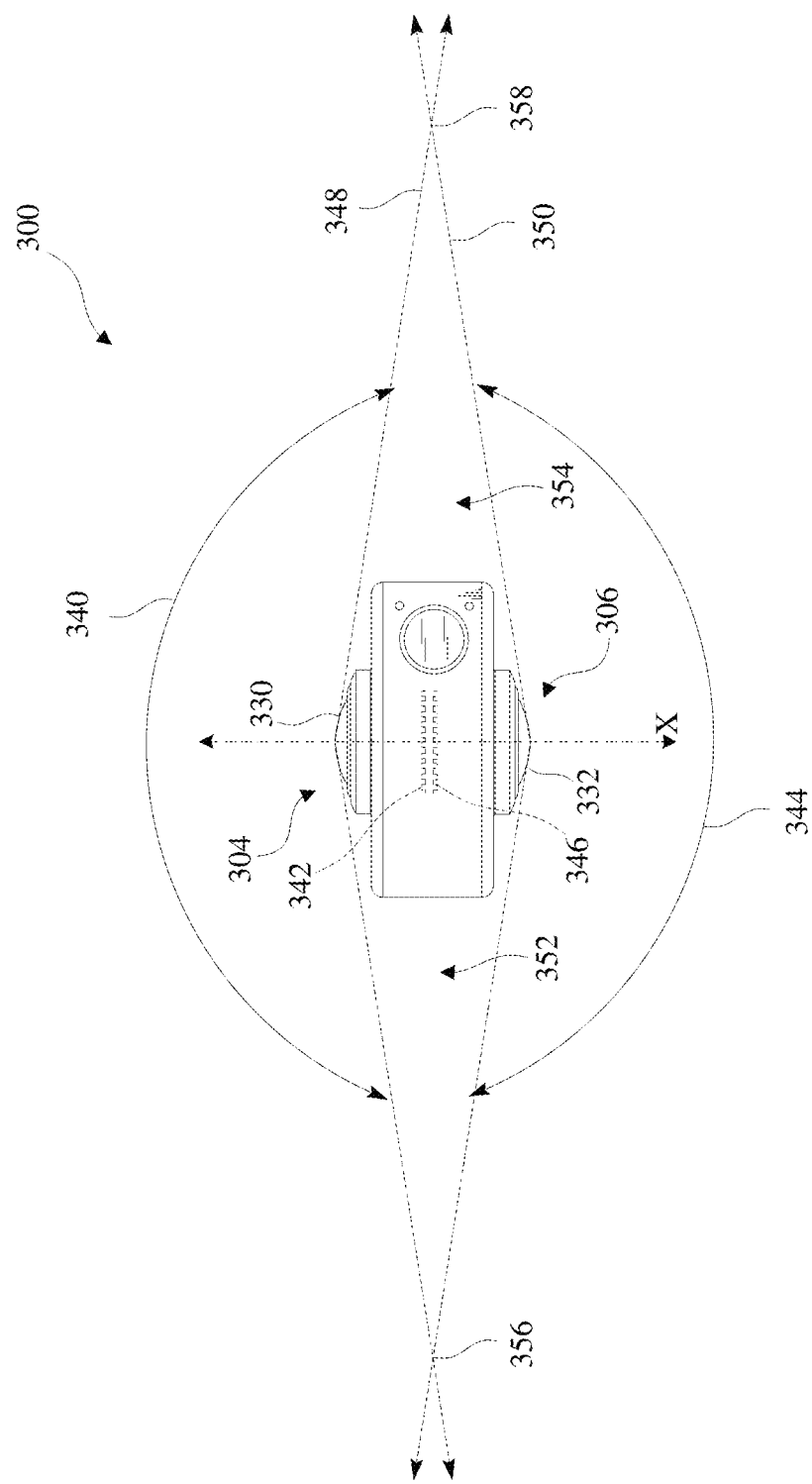
FIG. 3 is a top view of another example of an image capture apparatus.

FIG. 3 is a top view of an image capture apparatus 300. The image capture apparatus 300 is similar to the image capture apparatus 200 of FIGS. 2A-2B and is configured to capture spherical images.

As shown in FIG. 3, a first image capture device 304 includes a first lens 330 and a second image capture device 306 includes a second lens 332. For example, the first image capture device 304 may capture a first image, such as a first hemispheric, or hyper-hemispherical, image, the second image capture device 306 may capture a second image, such as a second hemispheric, or hyper-hemispherical, image, and the image capture apparatus 300 may generate a spherical image incorporating or combining the first image and the second image, which may be captured concurrently, or substantially concurrently.

The first image capture device 304 defines a first field-of-view 340 wherein the first lens 330 of the first image capture device 304 receives light. The first lens 330 directs the received light corresponding to the first field-of-view 340 onto a first image sensor 342 of the first image capture device 304. For example, the first image capture device 304 may include a first lens barrel (not expressly shown), extending from the first lens 330 to the first image sensor 342.

The second image capture device 306 defines a second field-of-view 344 wherein the second lens 332 receives light. The second lens 332 directs the received light corresponding to the second field-of-view 344 onto a second image sensor 346 of the second image capture device 306. For example, the second image capture device 306 may include a second lens barrel (not expressly shown), extending from the second lens 332 to the second image sensor 346.

A boundary 348 of the first field-of-view 340 is shown using broken directional lines. A boundary 350 of the second field-of-view 344 is shown using broken directional lines. As shown, the image capture devices 304, 306 are arranged in a back-to-back (Janus) configuration such that the lenses 330, 332 face in opposite directions, and such that the image capture apparatus 300 may capture spherical images. The first image sensor 342 captures a first hyper-hemispherical image plane from light entering the first lens 330. The second image sensor 346 captures a second hyper-hemispherical image plane from light entering the second lens 332.

As shown in FIG. 3, the fields-of-view 340, 344 partially overlap such that the combination of the fields-of-view 340, 344 forms a spherical field-of-view, except that one or more uncaptured areas 352, 354 may be outside of the fields-of-view 340, 344 of the lenses 330, 332. Light emanating from or passing through the uncaptured areas 352, 354, which may be proximal to the image capture apparatus 300, may be obscured from the lenses 330, 332 and the corresponding image sensors 342, 346, such that content corresponding to the uncaptured areas 352, 354 may be omitted from images captured by the image capture apparatus 300. In some implementations, the image capture devices 304, 306, or the lenses 330, 332 thereof, may be configured to minimize the uncaptured areas 352, 354.

Examples of points of transition, or overlap points, from the uncaptured areas 352, 354 to the overlapping portions of the fields-of-view 340, 344 are shown at 356, 358.

Images contemporaneously captured by the respective image sensors 342, 346 may be combined to form a combined image, such as a spherical image. Generating a combined image may include correlating the overlapping regions captured by the respective image sensors 342, 346, aligning the captured fields-of-view 340, 344, and stitching the images together to form a cohesive combined image. Stitching the images together may include correlating the overlap points 356, 358 with respective locations in corresponding images captured by the image sensors 342, 346. Although a planar view of the fields-of-view 340, 344 is shown in FIG. 3, the fields-of-view 340, 344 are hyper-hemispherical.

A change in the alignment, such as position, tilt, or a combination thereof, of the image capture devices 304, 306, such as of the lenses 330, 332, the image sensors 342, 346, or both, may change the relative positions of the respective fields-of-view 340, 344, may change the locations of the overlap points 356, 358, such as with respect to images captured by the image sensors 342, 346, and may change the uncaptured areas 352, 354, which may include changing the uncaptured areas 352, 354 unequally.

Incomplete or inaccurate information indicating the alignment of the image capture devices 304, 306, such as the locations of the overlap points 356, 358, may decrease the accuracy, efficiency, or both of generating a combined image. In some implementations, the image capture apparatus 300 may maintain information indicating the location and orientation of the image capture devices 304, 306, such as of the lenses 330, 332, the image sensors 342, 346, or both, such that the fields-of-view 340, 344, the overlap points 356, 358, or both may be accurately determined, which may improve the accuracy, efficiency, or both of generating a combined image.

The lenses 330, 332 may be aligned along an axis X as shown, laterally offset from each other (not shown), off-center from a central axis of the image capture apparatus 300 (not shown), or laterally offset and off-center from the central axis (not shown). Whether through use of offset or through use of compact image capture devices 304, 306, a reduction in distance between the lenses 330, 332 along the axis X may improve the overlap in the fields-of-view 340, 344, such as by reducing the uncaptured areas 352, 354.

Images or frames captured by the image capture devices 304, 306 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 356, 358, may be matched accurately to minimize boundary discontinuities.

Figure 4A:
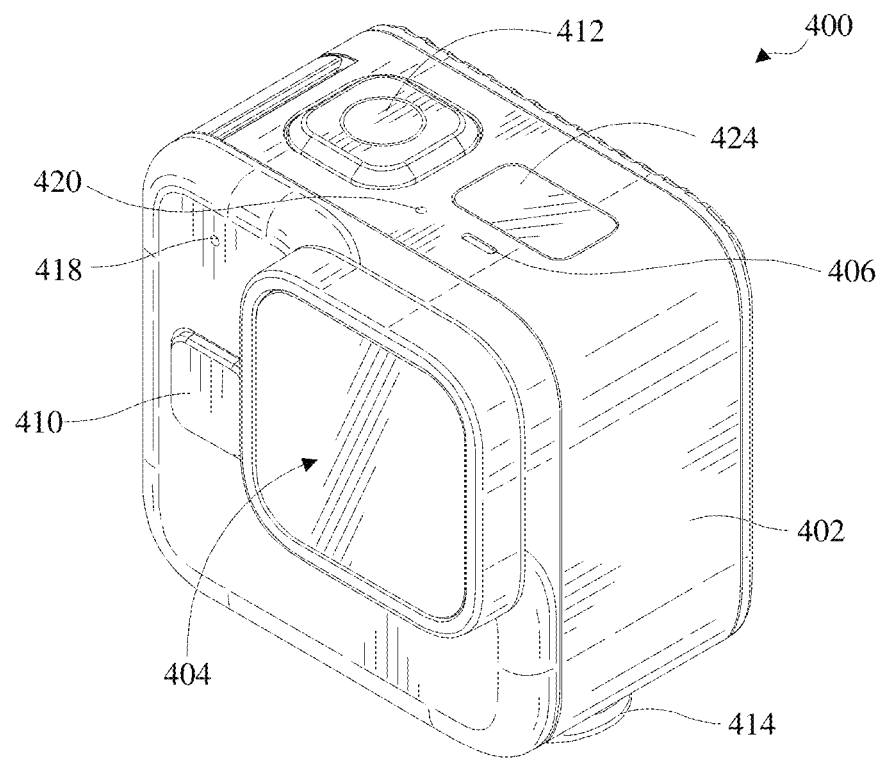
FIGS. 4A-4B are isometric views of another example of an image capture apparatus.
Figure 4B:
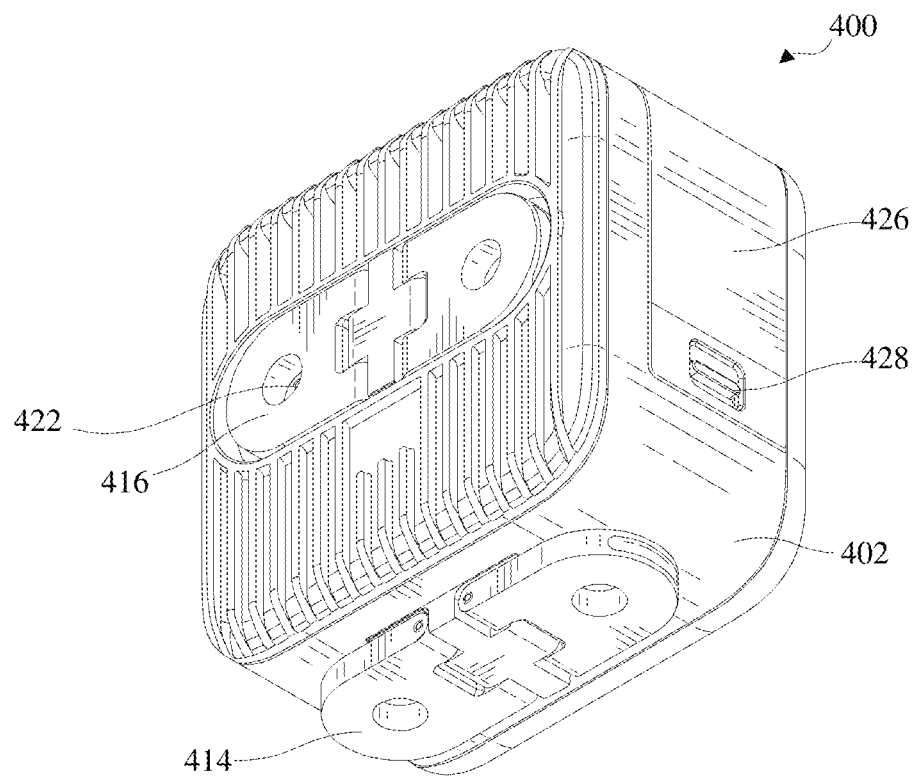

FIGS. 4A-4B illustrate another example of an image capture apparatus 400. The image capture apparatus 400 is similar to the image capture apparatus 100 shown in FIGS. 1A-1B and to the image capture apparatus 200 shown in FIGS. 2A-2B. The image capture apparatus 400 includes a body 402, an image capture device 404, an indicator 406, a mode button 410, a shutter button 412, interconnect mechanisms 414, 416, audio components 418, 420, 422, a display 424, and a door 426 including a release mechanism 428. The arrangement of the components of the image capture apparatus 400 shown in FIGS. 4A-4B is an example, other arrangements of elements may be used.

The body 402 of the image capture apparatus 400 may be similar to the body 102 shown in FIGS. 1A-1B. The image capture device 404 is structured on a front surface of the body 402. The image capture device 404 includes a lens and may be similar to the image capture device 104 shown in FIG. 1A.

As shown in FIG. 4A, the image capture apparatus 400 includes the indicator 406 on a top surface of the body 402. The indicator 406 may be similar to the indicator 106 shown in FIG. 1A. The indicator 406 may indicate a status of the image capture device 204. Although one indicator 406 is shown in FIGS. 4A, the image capture apparatus 400 may include other indictors structured on respective surfaces of the body 402.

As shown in FIGS. 4A, the image capture apparatus 400 includes input mechanisms including the mode button 410, structured on a front surface of the body 402, and the shutter button 412, structured on a top surface of the body 402. The mode button 410 may be similar to the mode button 110 shown in FIG. 1B. The shutter button 412 may be similar to the shutter button 112 shown in FIG. 1A.

The image capture apparatus 400 includes internal electronics (not expressly shown), such as imaging electronics, power electronics, and the like, internal to the body 402 for capturing images and performing other functions of the image capture apparatus 400. An example showing internal electronics is shown in FIG. 5.

As shown in FIGS. 4A-4B, the image capture apparatus 400 includes the interconnect mechanisms 414, 416, with a first interconnect mechanism 414 structured on a bottom surface of the body 402 and a second interconnect mechanism 416 disposed within a rear surface of the body 402. The interconnect mechanisms 414, 416 may be similar to the interconnect mechanism 140 shown in FIG. 1B and the interconnect mechanism 214 shown in FIG. 2A.

As shown in FIGS. 4A-4B, the image capture apparatus 400 includes the audio components 418, 420, 422 respectively structured on respective surfaces of the body 402. The audio components 418, 420, 422 may be similar to the microphones 128, 130, 132 and the speaker 138 shown in FIGS. 1A-1B. One or more of the audio components 418, 420, 422 may be, or may include, audio sensors, such as microphones, to receive and record audio signals, such as voice commands or other audio, in conjunction with capturing images or video. One or more of the audio components 418, 420, 422 may be, or may include, an audio presentation component that may present, or play, audio, such as to provide notifications or alerts.

As shown in FIGS. 4A-4B, a first audio component 418 is located on a front surface of the body 402, a second audio component 420 is located on a top surface of the body 402, and a third audio component 422 is located on a rear surface of the body 402. Other numbers and configurations for the audio components 418, 420, 422 may be used.

As shown in FIG. 4A, the image capture apparatus 400 includes the display 424 structured on a front surface of the body 402. The display 424 may be similar to the displays 108, 142 shown in FIGS. 1A-1B. The display 424 may include an I/O interface. The display 424 may receive touch inputs. The display 424 may display image information during video capture. The display 424 may provide status information to a user, such as status information indicating battery power level, memory card capacity, time elapsed for a recorded video, etc. The image capture apparatus 400 may include multiple displays structured on respective surfaces of the body 402. In some implementations, the display 424 may be omitted or combined with another component of the image capture apparatus 200.

As shown in FIG. 4B, the image capture apparatus 400 includes the door 426 structured on, or forming a portion of, the side surface of the body 402. The door 426 may be similar to the door 226 shown in FIG. 2B. The door 426 shown in FIG. 4B includes the release mechanism 428. The release mechanism 428 may include a latch, a button, or other mechanism configured to receive a user input that allows the door 426 to change position. The release mechanism 428 may be used to open the door 426 for a user to access a battery, a battery receptacle, an I/O interface, a memory card interface, etc.

In some embodiments, the image capture apparatus 400 may include features or components other than those described herein, some features or components described herein may be omitted, or some features or components described herein may be combined. For example, the image capture apparatus 400 may include additional interfaces or different interface features, interchangeable lenses, cold shoes, or hot shoes.

FIG. 5 is a block diagram of electronic components in an image capture apparatus 500. The image capture apparatus 500 may be a single-lens image capture device, a multi-lens image capture device, or variations thereof, including an image capture apparatus with multiple capabilities such as the use of interchangeable integrated sensor lens assemblies. Components, such as electronic components, of the image capture apparatus 100 shown in FIGS. 1A-1B, the image capture apparatus 200 shown in FIGS. 2A-2B, the image capture apparatus 300 shown in FIG. 3, or the image capture apparatus 400 shown in FIGS. 4A-4B, may be implemented as shown in FIG. 5.

The image capture apparatus 500 includes a body 502. The body 502 may be similar to the body 102 shown in FIGS. 1A-1B, the body 202 shown in FIGS. 2A-2B, or the body 402 shown in FIGS. 4A-4B. The body 502 includes electronic components such as capture components 510, processing components 520, data interface components 530, spatial sensors 540, power components 550, user interface components 560, and a bus 580.

The capture components 510 include an image sensor 512 for capturing images. Although one image sensor 512 is shown in FIG. 5, the capture components 510 may include multiple image sensors. The image sensor 512 may be similar to the image sensors 342, 346 shown in FIG. 3. The image sensor 512 may be, for example, a charge-coupled device (CCD) sensor, an active pixel sensor (APS), a complementary metal-oxide-semiconductor (CMOS) sensor, or an N-type metal-oxide-semiconductor (NMOS) sensor. The image sensor 512 detects light, such as within a defined spectrum, such as the visible light spectrum or the infrared spectrum, incident through a corresponding lens such as the first lens 330 with respect to the first image sensor 342 or the second lens 332 with respect to the second image sensor 346 as shown in FIG. 3. The image sensor 512 captures detected light as image data and conveys the captured image data as electrical signals (image signals or image data) to the other components of the image capture apparatus 500, such as to the processing components 520, such as via the bus 580.

The capture components 510 include a microphone 514 for capturing audio. Although one microphone 514 is shown in FIG. 5, the capture components 510 may include multiple microphones. The microphone 514 detects and captures, or records, sound, such as sound waves incident upon the microphone 514. The microphone 514 may detect, capture, or record sound in conjunction with capturing images by the image sensor 512. The microphone 514 may detect sound to receive audible commands to control the image capture apparatus 500. The microphone 514 may be similar to the microphones 128, 130, 132 shown in FIGS. 1A-1B, the audio components 218, 220, 222 shown in FIGS. 2A-2B, or the audio components 418, 420, 422 shown in FIGS. 4A-4B.

The processing components 520 perform image signal processing, such as filtering, tone mapping, or stitching, to generate, or obtain, processed images, or processed image data, based on image data obtained from the image sensor 512. The processing components 520 may include one or more processors having single or multiple processing cores. In some implementations, the processing components 520 may include, or may be, an application specific integrated circuit (ASIC) or a digital signal processor (DSP). For example, the processing components 520 may include a custom image signal processor. The processing components 520 conveys data, such as processed image data, with other components of the image capture apparatus 500 via the bus 580. In some implementations, the processing components 520 may include an encoder, such as an image or video encoder that may encode, decode, or both, the image data, such as for compression coding, transcoding, or a combination thereof.

Although not shown expressly in FIG. 5, the processing components 520 may include memory, such as a random-access memory (RAM) device, which may be non-transitory computer-readable memory. The memory of the processing components 520 may include executable instructions and data that can be accessed by the processing components 520.

The data interface components 530 communicates with other, such as external, electronic devices, such as a remote control, a smartphone, a tablet computer, a laptop computer, a desktop computer, or an external computer storage device. For example, the data interface components 530 may receive commands to operate the image capture apparatus 500. In another example, the data interface components 530 may transmit image data to transfer the image data to other electronic devices. The data interface components 530 may be configured for wired communication, wireless communication, or both. As shown, the data interface components 530 include an I/O interface 532, a wireless data interface 534, and a storage interface 536. In some implementations, one or more of the I/O interface 532, the wireless data interface 534, or the storage interface 536 may be omitted or combined.

The I/O interface 532 may send, receive, or both, wired electronic communications signals. For example, the I/O interface 532 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 532 is shown in FIG. 5, the data interface components 530 include multiple I/O interfaces. The I/O interface 532 may be similar to the data interface 124 shown in FIG. 1B.

The wireless data interface 534 may send, receive, or both, wireless electronic communications signals. The wireless data interface 534 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 534 is shown in FIG. 5, the data interface components 530 include multiple wireless data interfaces. The wireless data interface 534 may be similar to the data interface 124 shown in FIG. 1B.

The storage interface 536 may include a memory card connector, such as a memory card receptacle, configured to receive and operatively couple to a removable storage device, such as a memory card, and to transfer, such as read, write, or both, data between the image capture apparatus 500 and the memory card, such as for storing images, recorded audio, or both captured by the image capture apparatus 500 on the memory card. Although one storage interface 536 is shown in FIG. 5, the data interface components 530 include multiple storage interfaces. The storage interface 536 may be similar to the data interface 124 shown in FIG. 1B.

The spatial, or spatiotemporal, sensors 540 detect the spatial position, movement, or both, of the image capture apparatus 500. As shown in FIG. 5, the spatial sensors 540 include a position sensor 542, an accelerometer 544, and a gyroscope 546. The position sensor 542, which may be a global positioning system (GPS) sensor, may determine a geospatial position of the image capture apparatus 500, which may include obtaining, such as by receiving, temporal data, such as via a GPS signal. The accelerometer 544, which may be a three-axis accelerometer, may measure linear motion, linear acceleration, or both of the image capture apparatus 500. The gyroscope 546, which may be a three-axis gyroscope, may measure rotational motion, such as a rate of rotation, of the image capture apparatus 500. In some implementations, the spatial sensors 540 may include other types of spatial sensors. In some implementations, one or more of the position sensor 542, the accelerometer 544, and the gyroscope 546 may be omitted or combined. The power components 550 distribute electrical power to the components of the image capture apparatus 500 for operating the image capture apparatus 500. As shown in FIG. 5, the power components 550 include a battery interface 552, a battery 554, and an external power interface 556 (ext. interface). The battery interface 552 (bat. interface) operatively couples to the battery 554, such as via conductive contacts to transfer power from the battery 554 to the other electronic components of the image capture apparatus 500. The battery interface 552 may be similar to the battery receptacle 126 shown in FIG. 1B. The external power interface 556 obtains or receives power from an external source, such as a wall plug or external battery, and distributes the power to the components of the image capture apparatus 500, which may include distributing power to the battery 554 via the battery interface 552 to charge the battery 554. Although one battery interface 552, one battery 554, and one external power interface 556 are shown in FIG. 5, any number of battery interfaces, batteries, and external power interfaces may be used. In some implementations, one or more of the battery interface 552, the battery 554, and the external power interface 556 may be omitted or combined. For example, in some implementations, the external interface 556 and the I/O interface 532 may be combined.

The user interface components 560 receive input, such as user input, from a user of the image capture apparatus 500, output, such as display or present, information to a user, or both receive input and output information, such as in accordance with user interaction with the image capture apparatus 500.

As shown in FIG. 5, the user interface components 560 include visual output components 562 to visually communicate information, such as to present captured images. As shown, the visual output components 562 include an indicator 564 and a display 566. The indicator 564 may be similar to the indicator 106 shown in FIG. 1A, the indicators 208 shown in FIGS. 2A-2B, or the indicator 406 shown in FIG. 4A. The display 566 may be similar to the display 108 shown in FIG. 1A, the display 142 shown in FIG. 1B, the display 224 shown in FIG. 2B, or the display 424 shown in FIG. 4A. Although the visual output components 562 are shown in FIG. 5 as including one indicator 564, the visual output components 562 may include multiple indicators. Although the visual output components 562 are shown in FIG. 5 as including one display 566, the visual output components 562 may include multiple displays. In some implementations, one or more of the indicator 564 or the display 566 may be omitted or combined.

As shown in FIG. 5, the user interface components 560 include a speaker 568. The speaker 568 may be similar to the speaker 138 shown in FIG. 1B, the audio components 218, 220, 222 shown in FIGS. 2A-2B, or the audio components 418, 420, 422 shown in FIGS. 4A-4B. Although one speaker 568 is shown in FIG. 5, the user interface components 560 may include multiple speakers. In some implementations, the speaker 568 may be omitted or combined with another component of the image capture apparatus 500, such as the microphone 514.

As shown in FIG. 5, the user interface components 560 include a physical input interface 570. The physical input interface 570 may be similar to the mode buttons 110, 210, 410 shown in FIGS. 1A, 2A, and 4A or the shutter buttons 112, 212, 412 shown in FIGS. 1A, 2B, and 4A. Although one physical input interface 570 is shown in FIG. 5, the user interface components 560 may include multiple physical input interfaces. In some implementations, the physical input interface 570 may be omitted or combined with another component of the image capture apparatus 500. The physical input interface 570 may be, for example, a button, a toggle, a switch, a dial, or a slider.

As shown in FIG. 5, the user interface components 560 include a broken line border box labeled "other" to indicate that components of the image capture apparatus 500 other than the components expressly shown as included in the user interface components 560 may be user interface components. For example, the microphone 514 may receive, or capture, and process audio signals to obtain input data, such as user input data corresponding to voice commands. In another example, the image sensor 512 may receive, or capture, and process image data to obtain input data, such as user input data corresponding to visible gesture commands. In another example, one or more of the spatial sensors 540, such as a combination of the accelerometer 544 and the gyroscope 546, may receive, or capture, and process motion data to obtain input data, such as user input data corresponding to motion gesture commands.

FIG. 6 is a block diagram of an example of an image processing pipeline 600. The image processing pipeline 600, or a portion thereof, is implemented in an image capture apparatus, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, or another image capture apparatus. In some implementations, the image processing pipeline 600 may be implemented in a digital signal processor (DSP), an application-specific integrated circuit (ASIC), or a combination of a digital signal processor and an application-specific integrated circuit. One or more components of the pipeline 600 may be implemented in hardware, software, or a combination of hardware and software.

As shown in FIG. 6, the image processing pipeline 600 includes an image sensor 610, an image signal processor (ISP) 620, and an encoder 630. The encoder 630 is shown with a broken line border to indicate that the encoder may be omitted, or absent, from the image processing pipeline 600. In some implementations, the encoder 630 may be included in another device. In implementations that include the encoder 630, the image processing pipeline 600 may be an image processing and coding pipeline. The image processing pipeline 600 may include components other than the components shown in FIG. 6.

The image sensor 610 receives input 640, such as photons incident on the image sensor 610. The image sensor 610 captures image data (source image data). Capturing source image data includes measuring or sensing the input 640, which may include counting, or otherwise measuring, photons incident on the image sensor 610, such as for a defined temporal duration or period (exposure). Capturing source image data includes converting the analog input 640 to a digital source image signal in a defined format, which may be referred to herein as "a raw image signal." For example, the raw image signal may be in a format such as RGB format, which may represent individual pixels using a combination of values or components, such as a red component (R), a green component (G), and a blue component (B). In another example, the raw image signal may be in a Bayer format, wherein a respective pixel may be one of a combination of adjacent pixels, such as a combination of four adjacent pixels, of a Bayer pattern.

Although one image sensor 610 is shown in FIG. 6, the image processing pipeline 600 may include two or more image sensors. In some implementations, an image, or frame, such as an image, or frame, included in the source image signal, may be one of a sequence or series of images or frames of a video, such as a sequence, or series, of frames captured at a rate, or frame rate, which may be a number or cardinality of frames captured per defined temporal period, such as twenty-four, thirty, sixty, or one-hundred twenty frames per second.

The image sensor 610 obtains image acquisition configuration data 650. The image acquisition configuration data 650 may include image cropping parameters, binning/skipping parameters, pixel rate parameters, bitrate parameters, resolution parameters, framerate parameters, or other image acquisition configuration data or combinations of image acquisition configuration data. Obtaining the image acquisition configuration data 650 may include receiving the image acquisition configuration data 650 from a source other than a component of the image processing pipeline 600. For example, the image acquisition configuration data 650, or a portion thereof, may be received from another component, such as a user interface component, of the image capture apparatus implementing the image processing pipeline 600, such as one or more of the user interface components 560 shown in FIG. 5. The image sensor 610 obtains, outputs, or both, the source image data in accordance with the image acquisition configuration data 650. For example, the image sensor 610 may obtain the image acquisition configuration data 650 prior to capturing the source image.

The image sensor 610 receives, or otherwise obtains or accesses, adaptive acquisition control data 660, such as auto exposure (AE) data, auto white balance (AWB) data, global tone mapping (GTM) data, ACLS data, color correction data, or other adaptive acquisition control data or combination of adaptive acquisition control data. For example, the image sensor 610 receives the adaptive acquisition control data 660 from the image signal processor 620. The image sensor 610 obtains, outputs, or both, the source image data in accordance with the adaptive acquisition control data 660.

The image sensor 610 controls, such as configures, sets, or modifies, one or more image acquisition parameters or settings, or otherwise controls the operation of the image signal processor 620, in accordance with the image acquisition configuration data 650 and the adaptive acquisition control data 660. For example, the image sensor 610 may capture a first source image using, or in accordance with, the image acquisition configuration data 650, and in the absence of adaptive acquisition control data 660 or using defined values for the adaptive acquisition control data 660, output the first source image to the image signal processor 620, obtain adaptive acquisition control data 660 generated using the first source image data from the image signal processor 620, and capture a second source image using, or in accordance with, the image acquisition configuration data 650 and the adaptive acquisition control data 660 generated using the first source image. In an example, the adaptive acquisition control data 660 may include an exposure duration value and the image sensor 610 may capture an image in accordance with the exposure duration value.

The image sensor 610 outputs source image data, which may include the source image signal, image acquisition data, or a combination thereof, to the image signal processor 620.

The image signal processor 620 receives, or otherwise accesses or obtains, the source image data from the image sensor 610. The image signal processor 620 processes the source image data to obtain input image data. In some implementations, the image signal processor 620 converts the raw image signal (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

Processing the source image data includes generating the adaptive acquisition control data 660. The adaptive acquisition control data 660 includes data for controlling the acquisition of a one or more images by the image sensor 610.

The image signal processor 620 includes components not expressly shown in FIG. 6 for obtaining and processing the source image data. For example, the image signal processor 620 may include one or more sensor input (SEN) components (not shown), one or more sensor readout (SRO) components (not shown), one or more image data compression components, one or more image data decompression components, one or more internal memory, or data storage, components, one or more Bayer-to-Bayer (B2B) components, one or more local motion estimation (LME) components, one or more local motion compensation (LMC) components, one or more global motion compensation (GMC) components, one or more Bayer-to-RGB (B2R) components, one or more image processing units (IPU), one or more high dynamic range (HDR) components, one or more three-dimensional noise reduction (3DNR) components, one or more sharpening components, one or more raw-to-YUV (R2Y) components, one or more Chroma Noise Reduction (CNR) components, one or more local tone mapping (LTM) components, one or more YUV-to-YUV (Y2Y) components, one or more warp and blend components, one or more stitching cost components, one or more scaler components, or a configuration controller. The image signal processor 620, or respective components thereof, may be implemented in hardware, software, or a combination of hardware and software. Although one image signal processor 620 is shown in FIG. 6, the image processing pipeline 600 may include multiple image signal processors. In implementations that include multiple image signal processors, the functionality of the image signal processor 620 may be divided or distributed among the image signal processors.

In some implementations, the image signal processor 620 may implement or include multiple parallel, or partially parallel paths for image processing. For example, for high dynamic range image processing based on two source images, the image signal processor 620 may implement a first image processing path for a first source image and a second image processing path for a second source image, wherein the image processing paths may include components that are shared among the paths, such as memory components, and may include components that are separately included in each path, such as a first sensor readout component in the first image processing path and a second sensor readout component in the second image processing path, such that image processing by the respective paths may be performed in parallel, or partially in parallel.

The image signal processor 620, or one or more components thereof, such as the sensor input components, may perform black-point removal for the image data. In some implementations, the image sensor 610 may compress the source image data, or a portion thereof, and the image signal processor 620, or one or more components thereof, such as one or more of the sensor input components or one or more of the image data decompression components, may decompress the compressed source image data to obtain the source image data.

The image signal processor 620, or one or more components thereof, such as the sensor readout components, may perform dead pixel correction for the image data. The sensor readout component may perform scaling for the image data. The sensor readout component may obtain, such as generate or determine, adaptive acquisition control data, such as auto exposure data, auto white balance data, global tone mapping data, Auto Color Lens Shading data, or other adaptive acquisition control data, based on the source image data.

The image signal processor 620, or one or more components thereof, such as the image data compression components, may obtain the image data, or a portion thereof, such as from another component of the image signal processor 620, compress the image data, and output the compressed image data, such as to another component of the image signal processor 620, such as to a memory component of the image signal processor 620.

The image signal processor 620, or one or more components thereof, such as the image data decompression, or uncompression, components (UCX), may read, receive, or otherwise access, compressed image data and may decompress, or uncompress, the compressed image data to obtain image data. In some implementations, other components of the image signal processor 620 may request, such as send a request message or signal, the image data from an uncompression component, and, in response to the request, the uncompression component may obtain corresponding compressed image data, uncompress the compressed image data to obtain the requested image data, and output, such as send or otherwise make available, the requested image data to the component that requested the image data. The image signal processor 620 may include multiple uncompression components, which may be respectively optimized for uncompression with respect to one or more defined image data formats.

The image signal processor 620, or one or more components thereof, such as the internal memory, or data storage, components. The memory components store image data, such as compressed image data internally within the image signal processor 620 and are accessible to the image signal processor 620, or to components of the image signal processor 620. In some implementations, a memory component may be accessible, such as write accessible, to a defined component of the image signal processor 620, such as an image data compression component, and the memory component may be accessible, such as read accessible, to another defined component of the image signal processor 620, such as an uncompression component of the image signal processor 620.

The image signal processor 620, or one or more components thereof, such as the Bayer-to-Bayer components, which may process image data, such as to transform or convert the image data from a first Bayer format, such as a signed 15-bit Bayer format data, to second Bayer format, such as an unsigned 14-bit Bayer format. The Bayer-to-Bayer components may obtain, such as generate or determine, high dynamic range Tone Control data based on the current image data.

Although not expressly shown in FIG. 6, in some implementations, a respective Bayer-to-Bayer component may include one or more sub-components. For example, the Bayer-to-Bayer component may include one or more gain components. In another example, the Bayer-to-Bayer component may include one or more offset map components, which may respectively apply respective offset maps to the image data. The respective offset maps may have a configurable size, which may have a maximum size, such as 129×129. The respective offset maps may have a non-uniform grid. Applying the offset map may include saturation management, which may preserve saturated areas on respective images based on R, G, and B values. The values of the offset map may be modified per-frame and double buffering may be used for the map values. A respective offset map component may, such as prior to Bayer noise removal (denoising), compensate for non-uniform black point removal, such as due to non-uniform thermal heating of the sensor or image capture device. A respective offset map component may, such as subsequent to Bayer noise removal, compensate for flare, such as flare on hemispherical lenses, and/or may perform local contrast enhancement, such a dehazing or local tone mapping.

In another example, the Bayer-to-Bayer component may include a Bayer Noise Reduction (Bayer NR) component, which may convert image data, such as from a first format, such as a signed 15-bit Bayer format, to a second format, such as an unsigned 14-bit Bayer format. In another example, the Bayer-to-Bayer component may include one or more lens shading (FSHD) component, which may, respectively, perform lens shading correction, such as luminance lens shading correction, color lens shading correction, or both. In some implementations, a respective lens shading component may perform exposure compensation between two or more sensors of a multi-sensor image capture apparatus, such as between two hemispherical lenses. In some implementations, a respective lens shading component may apply map-based gains, radial model gain, or a combination, such as a multiplicative combination, thereof. In some implementations, a respective lens shading component may perform saturation management, which may preserve saturated areas on respective images. Map and lookup table values for a respective lens shading component may be configured or modified on a per-frame basis and double buffering may be used.

In another example, the Bayer-to-Bayer component may include a PZSFT component. In another example, the Bayer-to-Bayer component may include a half-RGB (½ RGB) component. In another example, the Bayer-to-Bayer component may include a color correction (CC) component, which may obtain subsampled data for local tone mapping, which may be used, for example, for applying an unsharp mask. In another example, the Bayer-to-Bayer component may include a Tone Control (TC) component, which may obtain subsampled data for local tone mapping, which may be used, for example, for applying an unsharp mask. In another example, the Bayer-to-Bayer component may include a Gamma (GM) component, which may apply a lookup-table independently per channel for color rendering (gamma curve application). Using a lookup-table, which may be an array, may reduce resource utilization, such as processor utilization, using an array indexing operation rather than more complex computation. The gamma component may obtain subsampled data for local tone mapping, which may be used, for example, for applying an unsharp mask.

In another example, the Bayer-to-Bayer component may include an RGB binning (RGB BIN) component, which may include a configurable binning factor, such as a binning factor configurable in the range from four to sixteen, such as four, eight, or sixteen. One or more sub-components of the Bayer-to-Bayer component, such as the RGB Binning component and the half-RGB component, may operate in parallel. The RGB binning component may output image data, such as to an external memory, which may include compressing the image data. The output of the RGB binning component may be a binned image, which may include low-resolution image data or low-resolution image map data. The output of the RGB binning component may be used to extract statistics for combining images, such as combining hemispherical images. The output of the RGB binning component may be used to estimate flare on one or more lenses, such as hemispherical lenses. The RGB binning component may obtain G channel values for the binned image by averaging Gr channel values and Gb channel values (e.g., two green channels). The RGB binning component may obtain one or more portions of or values for the binned image by averaging pixel values in spatial areas identified based on the binning factor. In another example, the Bayer-to-Bayer component may include, such as for spherical image processing, an RGB-to-YUV component, which may obtain tone mapping statistics, such as histogram data and thumbnail data, using a weight map, which may weight respective regions of interest prior to statistics aggregation.

The image signal processor 620, or one or more components thereof, such as the local motion estimation components, which may generate local motion estimation data for use in image signal processing and encoding, such as in correcting distortion, stitching, and/or motion compensation. For example, the local motion estimation components may partition an image into blocks, arbitrarily shaped patches, individual pixels, or a combination thereof. The local motion estimation components may compare pixel values between frames, such as successive images, to determine displacement, or movement, between frames, which may be expressed as motion vectors (local motion vectors).

The image signal processor 620, or one or more components thereof, such as the local motion compensation components, which may obtain local motion data, such as local motion vectors, and may spatially apply the local motion data to an image to obtain a local motion compensated image or frame and may output the local motion compensated image or frame to one or more other components of the image signal processor 620.

The image signal processor 620, or one or more components thereof, such as the global motion compensation components, may receive, or otherwise access, global motion data, such as global motion data from a gyroscopic unit of the image capture apparatus, such as the gyroscope 546 shown in FIG. 5, corresponding to the current frame. The global motion compensation component may apply the global motion data to a current image to obtain a global motion compensated image, which the global motion compensation component may output, or otherwise make available, to one or more other components of the image signal processor 620.

The image signal processor 620, or one or more components thereof, such as the Bayer-to-RGB components, which convert the image data from Bayer format to an RGB format. The Bayer-to-RGB components may implement white balancing and demosaicing. The Bayer-to-RGB components respectively output, or otherwise make available, RGB format image data to one or more other components of the image signal processor 620.

The image signal processor 620, or one or more components thereof, such as the image processing units, which perform warping, image registration, electronic image stabilization, motion detection, object detection, or the like. The image processing units respectively output, or otherwise make available, processed, or partially processed, image data to one or more other components of the image signal processor 620.

The image signal processor 620, or one or more components thereof, such as the high dynamic range components, may, respectively, generate high dynamic range images based on the current input image, the corresponding local motion compensated frame, the corresponding global motion compensated frame, or a combination thereof. The high dynamic range components respectively output, or otherwise make available, high dynamic range images to one or more other components of the image signal processor 620.

The high dynamic range components of the image signal processor 620 may, respectively, include one or more high dynamic range core components, one or more tone control (TC) components, or one or more high dynamic range core components and one or more tone control components. For example, the image signal processor 620 may include a high dynamic range component that includes a high dynamic range core component and a tone control component. The high dynamic range core component may obtain, or generate, combined image data, such as a high dynamic range image, by merging, fusing, or combining the image data, such as unsigned 14-bit RGB format image data, for multiple, such as two, images (HDR fusion) to obtain, and output, the high dynamic range image, such as in an unsigned 23-bit RGB format (full dynamic data). The high dynamic range core component may output the combined image data to the Tone Control component, or to other components of the image signal processor 620. The Tone Control component may compress the combined image data, such as from the unsigned 23-bit RGB format data to an unsigned 17-bit RGB format (enhanced dynamic data).

The image signal processor 620, or one or more components thereof, such as the three-dimensional noise reduction components reduce image noise for a frame based on one or more previously processed frames and output, or otherwise make available, noise reduced images to one or more other components of the image signal processor 620. In some implementations, the three-dimensional noise reduction component may be omitted or may be replaced by one or more lower-dimensional noise reduction components, such as by a spatial noise reduction component. The three-dimensional noise reduction components of the image signal processor 620 may, respectively, include one or more temporal noise reduction (TNR) components, one or more raw-to-raw (R2R) components, or one or more temporal noise reduction components and one or more raw-to-raw components. For example, the image signal processor 620 may include a three-dimensional noise reduction component that includes a temporal noise reduction component and a raw-to-raw component.

The image signal processor 620, or one or more components thereof, such as the sharpening components, obtains sharpened image data based on the image data, such as based on noise reduced image data, which may recover image detail, such as detail reduced by temporal denoising or warping. The sharpening components respectively output, or otherwise make available, sharpened image data to one or more other components of the image signal processor 620.

The image signal processor 620, or one or more components thereof, such as the raw-to-YUV components, may transform, or convert, image data, such as from the raw image format to another image format, such as the YUV format, which includes a combination of a luminance (Y) component and two chrominance (UV) components. The raw-to-YUV components may, respectively, demosaic, color process, or a both, images.

Although not expressly shown in FIG. 6, in some implementations, a respective raw-to-YUV component may include one or more sub-components. For example, the raw-to-YUV component may include a white balance (WB) component, which performs white balance correction on the image data. In another example, a respective raw-to-YUV component may include one or more color correction components (CC0, CC1), which may implement linear color rendering, which may include applying a 3×3 color matrix. For example, the raw-to-YUV component may include a first color correction component (CC0) and a second color correction component (CC1). In another example, a respective raw-to-YUV component may include a three-dimensional lookup table component, such as subsequent to a first color correction component. Although not expressly shown in FIG. 6, in some implementations, a respective raw-to-YUV component may include a Multi-Axis Color Correction (MCC) component, such as subsequent to a three-dimensional lookup table component, which may implement non-linear color rendering, such as in Hue, Saturation, Value (HSV) space.

In another example, a respective raw-to-YUV component may include a black point RGB removal (BPRGB) component, which may process image data, such as low intensity values, such as values within a defined intensity threshold, such as less than or equal to, $2^8$, to obtain histogram data wherein values exceeding a defined intensity threshold may be omitted, or excluded, from the histogram data processing. In another example, a respective raw-to-YUV component may include a Multiple Tone Control (Multi-TC) component, which may convert image data, such as unsigned 17-bit RGB image data, to another format, such as unsigned 14-bit RGB image data. The Multiple Tone Control component may apply dynamic tone mapping to the Y channel (luminance) data, which may be based on, for example, image capture conditions, such as light conditions or scene conditions. The tone mapping may include local tone mapping, global tone mapping, or a combination thereof.

In another example, a respective raw-to-YUV component may include a Gamma (GM) component, which may convert image data, such as unsigned 14-bit RGB image data, to another format, such as unsigned 10-bit RGB image data. The Gamma component may apply a lookup-table independently per channel for color rendering (gamma curve application). Using a lookup-table, which may be an array, may reduce resource utilization, such as processor utilization, using an array indexing operation rather than more complex computation. In another example, a respective raw-to-YUV component may include a three-dimensional lookup table (3DLUT) component, which may include, or may be, a three-dimensional lookup table, which may map RGB input values to RGB output values through a non-linear function for non-linear color rendering. In another example, a respective raw-to-YUV component may include a Multi-Axis Color Correction (MCC) component, which may implement non-linear color rendering. For example, the multi-axis color correction component may perform color non-linear rendering, such as in Hue, Saturation, Value (HSV) space.

The image signal processor 620, or one or more components thereof, such as the Chroma Noise Reduction (CNR) components, may perform chroma denoising, luma denoising, or both.

The image signal processor 620, or one or more components thereof, such as the local tone mapping components, may perform multi-scale local tone mapping using a single pass approach or a multi-pass approach on a frame at different scales. The as the local tone mapping components may, respectively, enhance detail and may omit introducing artifacts. For example, the Local Tone Mapping components may, respectively, apply tone mapping, which may be similar to applying an unsharp-mask. Processing an image by the local tone mapping components may include obtaining, processing, such as in response to gamma correction, tone control, or both, and using a low-resolution map for local tone mapping.

The image signal processor 620, or one or more components thereof, such as the YUV-to-YUV (Y2Y) components, may perform local tone mapping of YUV images. In some implementations, the YUV-to-YUV components may include multi-scale local tone mapping using a single pass approach or a multi-pass approach on a frame at different scales.

The image signal processor 620, or one or more components thereof, such as the warp and blend components, may warp images, blend images, or both. In some implementations, the warp and blend components may warp a corona around the equator of a respective frame to a rectangle. For example, the warp and blend components may warp a corona around the equator of a respective frame to a rectangle based on the corresponding low-resolution frame. The warp and blend components, may, respectively, apply one or more transformations to the frames, such as to correct for distortions at image edges, which may be subject to a close to identity constraint.

The image signal processor 620, or one or more components thereof, such as the stitching cost components, may generate a stitching cost map, which may be represented as a rectangle having disparity (x) and longitude (y) based on a warping. Respective values of the stitching cost map may be a cost function of a disparity (x) value for a corresponding longitude. Stitching cost maps may be generated for various scales, longitudes, and disparities.

The image signal processor 620, or one or more components thereof, such as the scaler components, may scale images, such as in patches, or blocks, of pixels, such as 16×16 blocks, 8×8 blocks, or patches or blocks of any other size or combination of sizes.

The image signal processor 620, or one or more components thereof, such as the configuration controller, may control the operation of the image signal processor 620, or the components thereof.

The image signal processor 620 outputs processed image data, such as by storing the processed image data in a memory of the image capture apparatus, such as external to the image signal processor 620, or by sending, or otherwise making available, the processed image data to another component of the image processing pipeline 600, such as the encoder 630, or to another component of the image capture apparatus.

The encoder 630 encodes or compresses the output of the image signal processor 620. In some implementations, the encoder 630 implements one or more encoding standards, which may include motion estimation. The encoder 630 outputs the encoded processed image to an output 670. In an embodiment that does not include the encoder 630, the image signal processor 620 outputs the processed image to the output 670. The output 670 may include, for example, a display, such as a display of the image capture apparatus, such as one or more of the displays 108, 142 shown in FIGS. 1A-1B, the display 224 shown in FIG. 2B, the display 424 shown in FIG. 4A, or the display 566 shown in FIG. 5, to a storage device, or both. The output 670 is a signal, such as to an external device.

Figure 7:
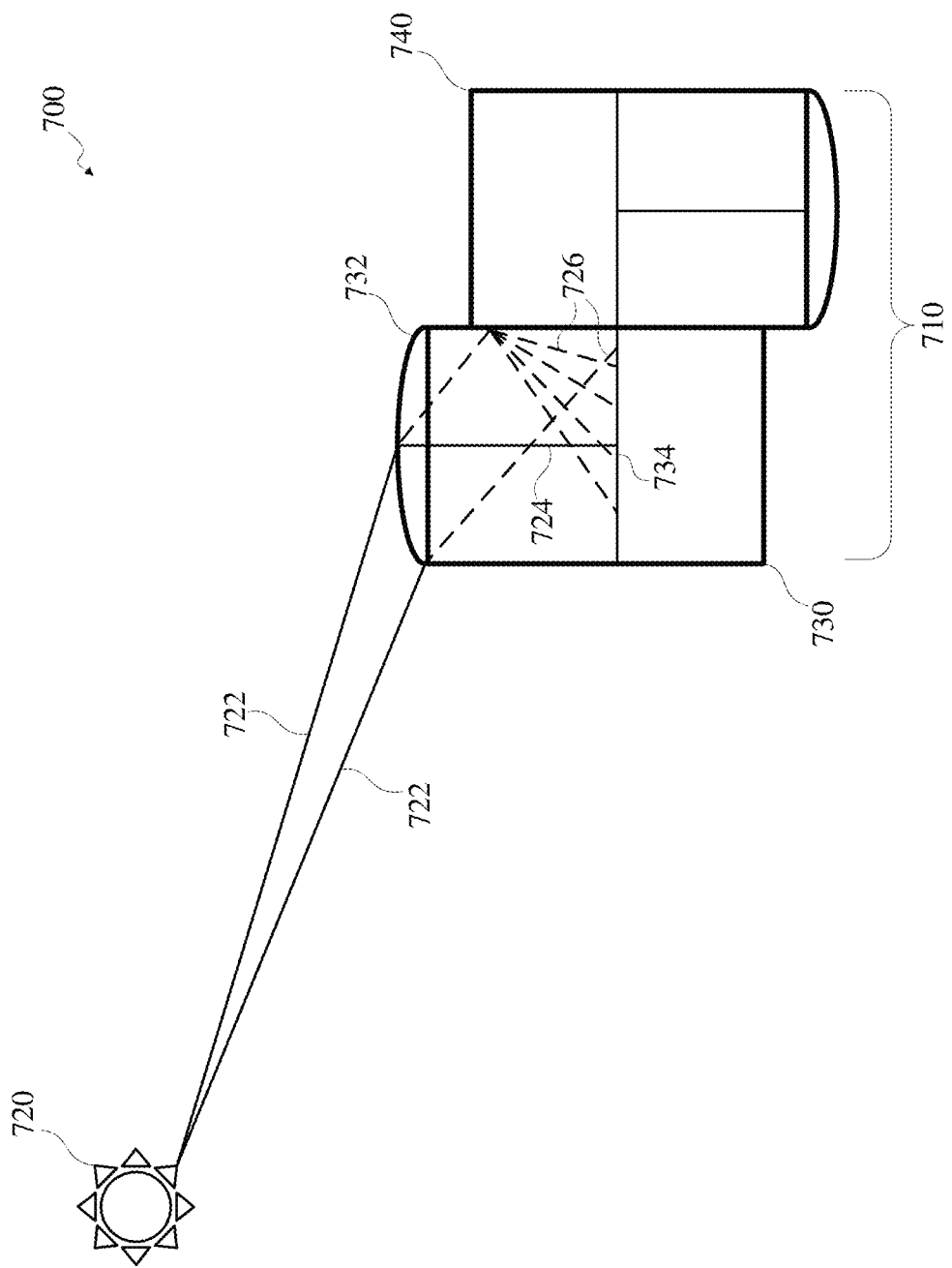
FIG. 7 is a diagram of an example of a lens flare scenario in accordance with implementations of this disclosure.

FIG. 7 is a diagram of an example of a lens flare scenario 700 in accordance with implementations of this disclosure. The lens flare scenario 700 may include an image capture apparatus 710 for capturing one or more images of a scene, which may include a primary light source 720, such that one or more of the images captured includes lens flare.

The image capture apparatus 710 may be a multi-face image capture apparatus, such as the image capture device 200 shown in FIG. 2, and may include two or more image capture devices 730, 740, which may have overlapping fields-of-view, such as the overlapping fields-of-view 340 and 344 shown in FIG. 3. For simplicity and clarity, the image capture apparatus 710 shown in FIG. 7 includes a first image capture device 730 and a second image capture device 740; however, the image capture apparatus 710 may include more image capture devices.

For example, the first image capture device 730 may include one or more optical elements 732, such as one or more of the lenses 330, 332 shown in FIG. 3, and one or more image sensors 734, such as the first image sensor 342 or the second image sensor 346 shown in FIG. 3.

The primary light source 720 may be the sun or another relatively bright light source, such as a high luminosity object in the scene, such as an object that is ten-thousand times brighter than other objects in the scene. The image capture apparatus 710 may be oriented with respect to, or relative to, the primary light source 720, such that the field-of-view of the first image capture device 730 includes the primary light source 720, and the field-of-view of the second image capture device 740 omits the primary light source 720.

The light 722 from the primary light source 720 may be directly received by the first image capture device 730. Other light, such as reflected light, light from a secondary light source, or a combination thereof, may be received by the first image capture device 730. The light 722 from the primary light source 720 may be prevented from being directly received by the second image capture device 740. Other light, such as reflected light, light from a secondary light source, or a combination thereof, may be received by the second image capture device 740.

In some embodiments, the primary light source 720 may be omitted from the respective fields-of-view of the image capture apparatus 710, the primary light source 720 may be relatively near the field-of-view of the first image capture device 730, some of the light 722 from the primary light source 720 may be directly received by the first image capture device 730, and the image captured by the first image capture device 730 may include lens flare. Although the lens flare is shown to result from primary light source 720, it is understood that lens flare may result from multiple light sources. The multiple light sources may be distributed on both sides of the device such that each image capture device receives a subset of light sources. In some examples, one or more light sources may be in the overlapping area.

A significant portion, such as 99.9, or 99.99, percent, of the light received, captured, measured, sampled, or otherwise used by the image sensor 734 to obtain the image may be light received via a primary image capture path 724. For example, the light received via the primary image capture path 724 may be light received by the optical elements 732 of the first image capture device 730 and focused by the optical elements 732 along the primary image capture path 724 to the image sensor 734 of the first image capture device 730.

A small portion, such as one-tenth, or one-hundredth, of one percent, of the light received, captured, measured, sampled, or otherwise used by the image sensor 734 to obtain the image may be light received via one or more secondary image capture paths 726, as indicated by the broken lines in FIG. 7. For example, the light received via the secondary image capture paths 726 may be light, which may include a portion of the light 722 directly from the primary light source 720, reflected, refracted, or otherwise propagated along the secondary image capture paths 726 to the image sensor 734, such as light reflected off of an inner surface of the image capture device 730.

Light received by the image sensor 734 along one or more of the secondary image capture paths 726 may be captured, or otherwise included in a captured image, as a lens flare artifact. As used herein, the term "lens flare artifact" may refer to one or more distinct portions of a captured image corresponding to light received along one or more of the secondary image capture paths 726. For example, the distinct portions of the captured images corresponding to a lens flare artifact may be one or more geometric shapes, such as circles, which may correspond with the shape of an iris of the lens, and which may be distributed along a line in the captured image. Lens flare artifacts may be visually distinguishable from other visible elements captured in an image. An example of an image including lens flare artifacts is shown in FIG. 8.

Figure 9:
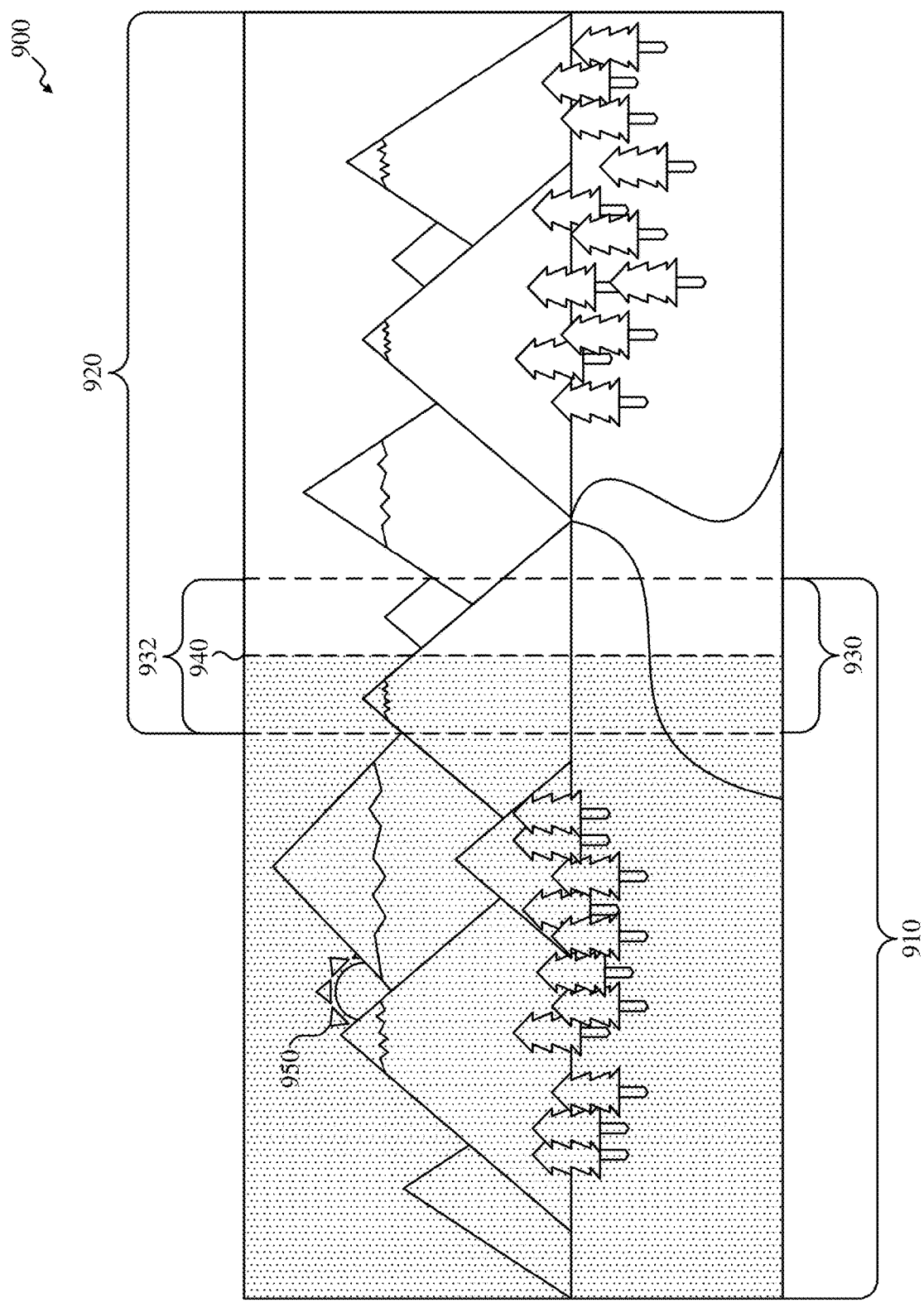
FIG. 9 is a diagram of an example of a combined image including diffuse lens flare in accordance with implementations of this disclosure.

Light received by the image sensor 734 along one or more of the secondary image capture paths 726 may be captured, or otherwise included in a captured image, as diffuse lens flare. As used herein, the term "diffuse lens flare" may refer to a spatially indistinct color, or luminance, distortion, such as distortion in contrast or color saturation, which may be distributed throughout the captured image, or a significant portion, such as greater than half, thereof. Diffuse lens flare may be visually indistinguishable from other visible elements captured in an image. The intensity, brightness, or amount of distortion associated with diffuse lens flare may vary within an image, such as based on the relative orientation of the image capture apparatus 710 to the primary light source 720. An example of an image including diffuse lens flare is shown in FIG. 9.

The second image capture device 740 may concurrently, or substantially concurrently, capture an image, or frame, temporally corresponding to, and spatially partially overlapping, the image captured by the first image capture device 730. The image captured by the second image capture device 740 may omit the lens flare.

Figure 8:
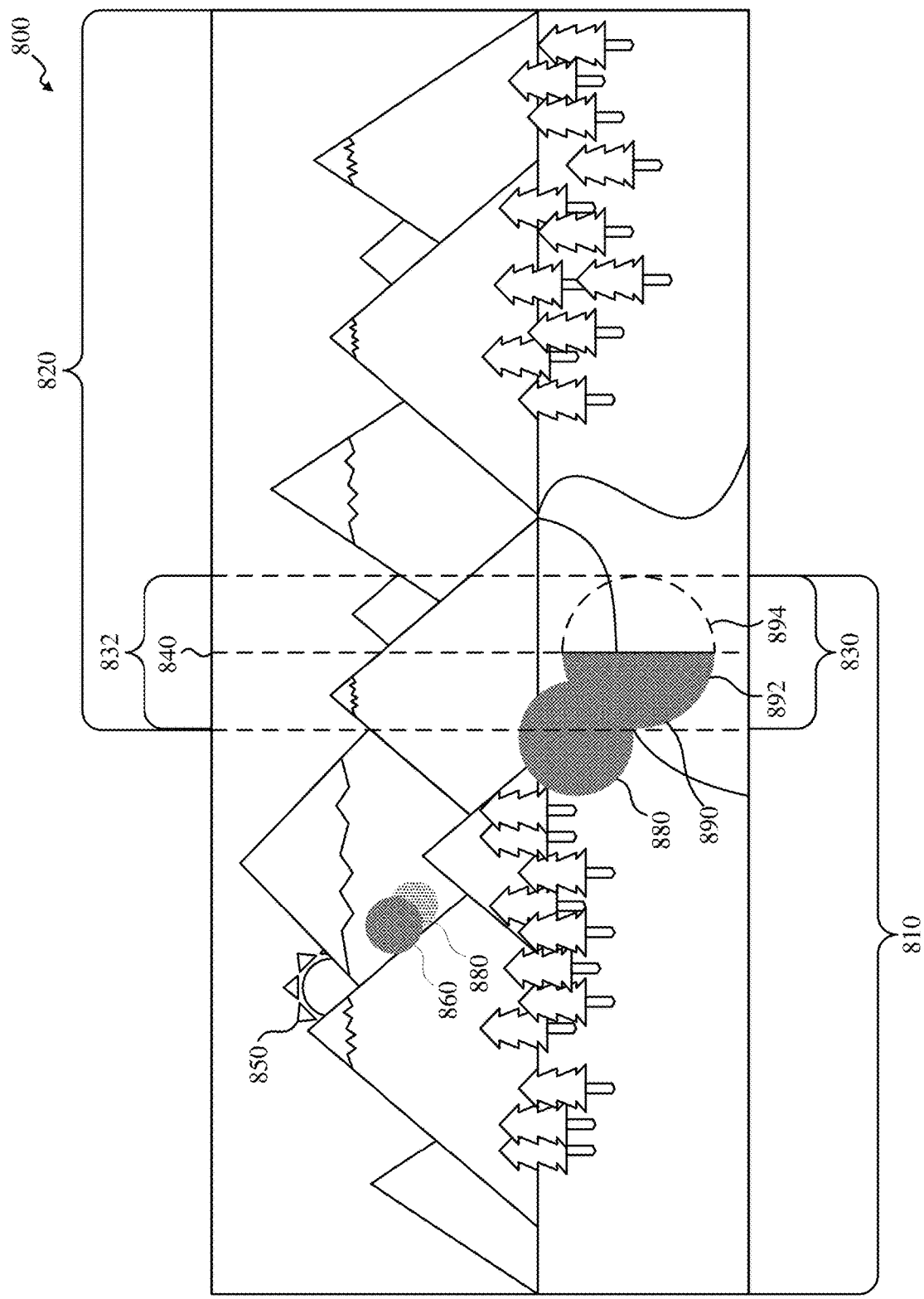
FIG. 8 is a diagram of an example of a combined image including lens flare artifacts in accordance with implementations of this disclosure.

FIG. 8 is a diagram of an example of a combined image 800 including lens flare artifacts in accordance with implementations of this disclosure. The combined image 800 may be an image obtained by combining, merging, or stitching together temporally concurrent, or substantially temporally concurrent, spatially overlapping images captured by respective image capture devices of an image capture apparatus, such as the image capture apparatus 300 shown in FIG. 3, or the image capture devices 730, 740 of the image capture apparatus 710 shown in FIG. 7.

For example, a first image capture device may capture the back image 810, and a second image capture device may capture the front image 820. The first image capture device and the second image capture device may have overlapping fields-of-view; the first image 810 may include an overlapping portion 830; and the second image 820 may include a spatially corresponding overlapping portion 832. A combined image 800 may be obtained by combining, merging, or stitching the first image 810 together with the second image 820 along a stitching boundary 840.

The first image 810 may include a primary light source 850, such as the sun, and may include lens flare artifacts 860, 870, 880, 890 corresponding to the primary light source 850. The second image 820 may omit the primary light source 850 and may omit the lens flare artifacts 860, 870, 880, 890. The lens flare artifact 890 may intersect with the stitching boundary 840; a portion 892 of the lens flare artifact 890 along the stitching boundary 840 may be included in the combined image 800, as indicated by the stippled background at 892; and a portion 894 of the lens flare artifact 890 along the stitching boundary 840 may be omitted from the combined image 800, as indicated by the broken line border at 894.

For simplicity and clarity, the input images 810, 820 shown in FIG. 8 are referred to as the back image 810 and the front image 820, respectively, and the combined image is shown as being combined along a vertical stitching boundary 840; however, the relative orientation of the respective images and the path of the stitching boundary may differ. For example, the stitching boundary may have a sinusoidal path.

FIG. 9 is a diagram of an example of a combined image 900 including diffuse lens flare in accordance with implementations of this disclosure. The combined image 900 may be an image obtained by combining, merging, or stitching together, temporally concurrent, or substantially concurrent, spatially overlapping images captured by respective image capture devices of an image capture apparatus, such as the image capture devices 730, 740 of the image capture apparatus 710 shown in FIG. 7.

For example, a first image capture device may capture the back image 910, and a second image capture device may capture the front image 920. The first image capture device and the second image capture device may have overlapping fields-of-view; the first image 910 may include an overlapping portion 930; and the second image 920 may include a spatially corresponding overlapping portion 932. A combined image 900 may be obtained by combining, merging, or stitching the first image 910 together with the second image 920 along a stitching boundary 940.

The first image 910 may include a primary light source 950, such as the sun, and may include diffuse lens flare corresponding to the primary light source 950, as indicated by the stippled background. The stippled background is shown for clarity in FIG. 9. The diffuse lens flare may distort the color of the first image 910 and the corresponding portion of the combined image 900, such as by decreasing contrast or color saturation, which may cause the first image 910 and the corresponding portion of the combined image 900 to appear lighter, brighter, pale, hazy, foggy, less detailed, or a combination thereof.

The second image 920 may omit the primary light source 950 and may omit the diffuse lens flare, as indicated by the white background. For example, the second image 920, and the portion of the combined image 900 corresponding to the second image 920, may be darker than the first image 910 and the portion of the combined image 900 corresponding to the first image 910.

In some embodiments, an image may include lens flare artifacts, such as the lens flare artifacts 860, 870, 880, 890 shown in FIG. 8, and diffuse lens flare, such as the diffuse lens flare shown in FIG. 9.

For simplicity and clarity, the input images 910, 920 shown in FIG. 9 are referred to as the back image 910 and the front image 920, respectively, and the combined image is shown as being combined along a vertical stitching boundary 940; however, the relative orientation of the respective images and the path of the stitching boundary may differ. For example, the stitching boundary may have a sinusoidal path. In another example, the input images may be spherical images, and the overlapping portions may be a respective ring along the outer edge of each of the spherical images.

Figure 10:
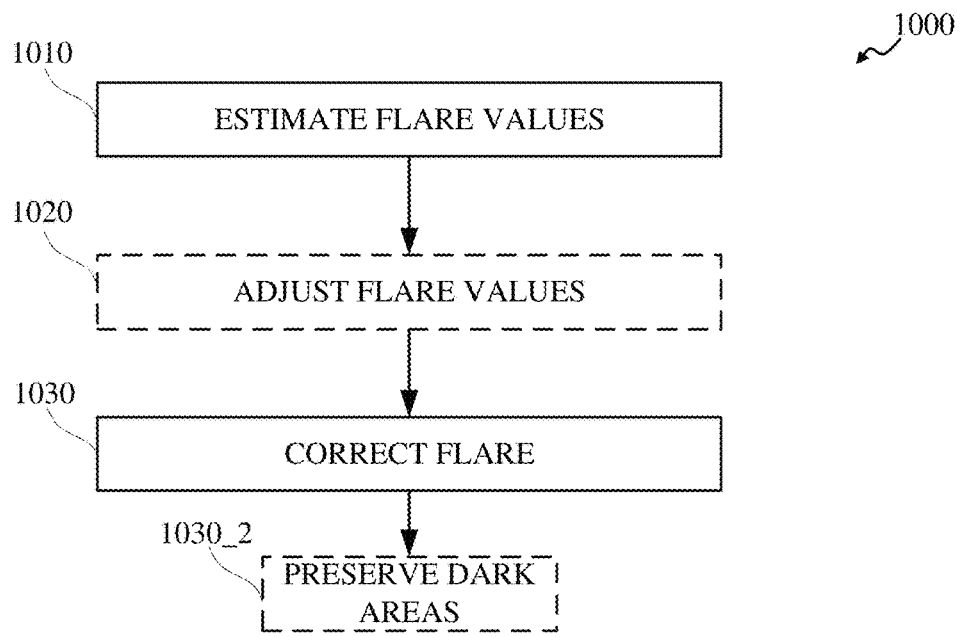
FIG. 10 is a flowchart of a technique for flare compensation.

FIG. 10 is a flowchart of a technique 1000 for flare compensation. The technique 1000 can be implemented in or by the ISP 620 of FIG. 6. The technique 1000 can be implemented, for example, as a software program that may be executed by an image capture apparatus, such as the image capture apparatus 200 of FIGS. 2A-2B or the image capture apparatus 300 of FIG. 3. The software program can include machine-readable instructions that may be stored in a memory such as the storage 536 of FIG. 5 or a memory of the processing components 520 of FIG. 5, and that, when executed by a processor, such as a component of the processing components 520 of FIG. 5, may cause the image capture apparatus to perform the technique 1000. The technique 1000 can be implemented using specialized hardware or firmware. Multiple processors, memories, or both, may be used.

In some implementations, the technique 1000 can performed after black point removal and after applying white balancing. In other implementations, the technique 1000 can be performed at least before white balancing. At such, by performing white balancing after flare correction, white balancing can more accurately estimate the white balance scales. The technique 1000 is described with respect to two images, referred to for ease of reference, as a front image and a back image. The front image and the back image are captured by a first lens (e.g., a front lens) and a second lens (e.g., a back lens) of the image capture apparatus.

At 1010, flare values are estimated. One flare value may be estimates for each color channel. That is, an estimated flare value may be obtained for each of the red, green, and blue color channels. The flare values are estimated using raw images (or downscaled images therefor) and other statistics. As mentioned above, a raw image contains minimally processed data from the image sensors of the image capture apparatus. The statistics can include tuned values that do not require processing of the raw images. The statistics can include LEC, ACLS, down-sampled images, and ring grids. Flare estimation is further described with respect to FIG. 11.

Figure 12:
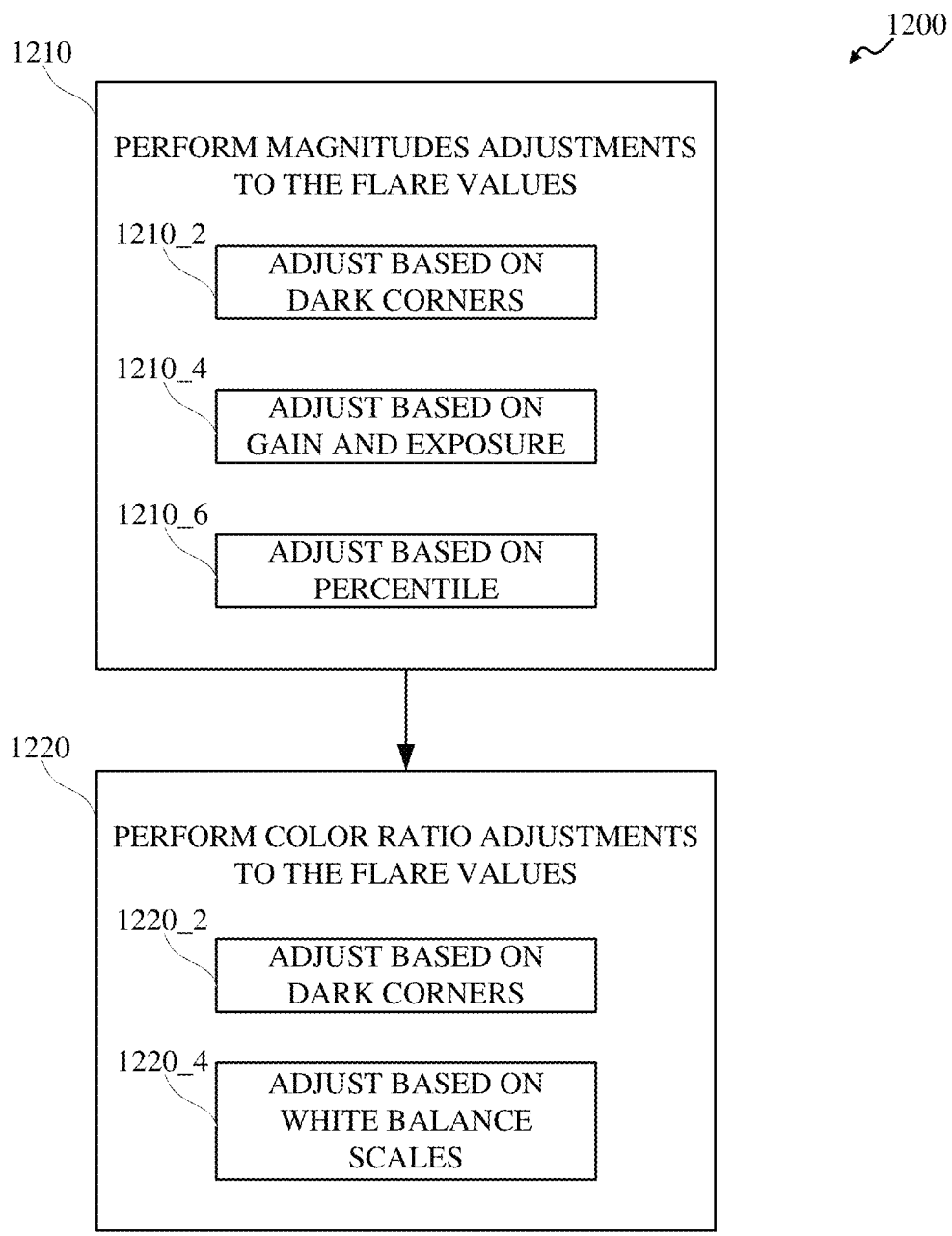
FIG. 12 is a flowchart of a technique for adjusting flare values.

At 1020, the technique 1000 may optionally adjust the estimated flare values, as described with respect to FIG. 12. Zero or more adjustments may be applied to the estimated flare values.

At 1030, the flare in at least one of the images is corrected based on the flare values. That is, each of the flare values are subtracted from one or the other of the front or back images. As is further described below, a flareBands variables includes the flare estimates (which may be adjusted flare estimates) for each color channel. To be clear, the term "flare value" that is finally used for adjusting an image can be an adjusted flare value.

Flare can be corrected on each color channel independently. For a given color channel, which of the front or back image is modified depends on the whether the corresponding flare value is positive or negative. As described herein, flare is estimated based on data obtained from the front lens minus data obtained from the back lens. As the flare is an additive effect, the lens with the flare (per color channel) will be brighter than the lens without the flare. As such, the sign can be indicative of the lens with the flare. For positive flare values, which indicate that the flare originates from the front lens, the flare is subtracted from the corresponding front channel. Conversely, for negative flare values, the flare is added to the back image. Said another way, the absolute value of a negative flare value is subtracted from the back image. As such, in an implementation, for each of the color channels and for each pixel in a raw image, the pixel value is adjusted by adding or removing the corresponding flare value, as described. In some implementations, correcting the flare, at 1030, can be or include correcting the flare while simultaneously preserving dark areas, at 1030_2, which is further described below.

Figure 11:
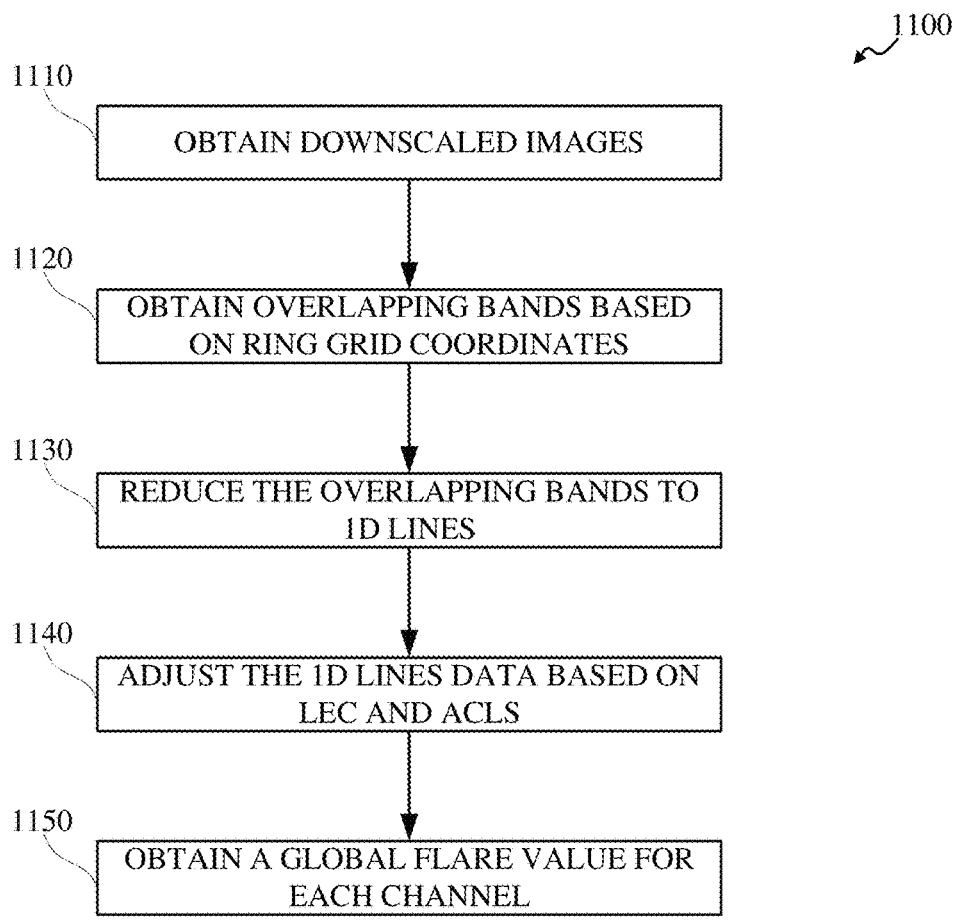
FIG. 11 is a flowchart of a technique for flare estimation.

FIG. 11 is a flowchart of a technique 1100 for flare estimation.

At 1110, downscaled images are obtained. The downscaled images include a back downscaled image and a front downscaled image. A downscaled image can be derived from statistics obtained from the white balance (automatic white balance (AWB)) algorithm.

The process of downscaling the image simplifies the subsequent steps of flare estimation by reducing the computational load. The downscaled image is typically a much smaller representation of the original, maintaining the essential characteristics needed for accurate flare estimation. For example, a downscaled image of 48×64 pixels is used as a proxy for the original image, which could be as large as 3000×3000 pixels. This reduction in size allows for quicker processing while still providing sufficient detail for effective flare estimation.

At 1120, overlapping bands are obtained based on ring grid coordinates. Ring grids refer to a specific set of coordinates within an image, typically associated with the overlapping regions (i.e., bands) in images captured by dual-lens cameras (i.e., the front lens and the back lens). The ring grid coordinates map the stitch line or the area where two distinct image fields overlap and are stitched together. Ring grid coordinates are determined during the calibration process of the image capture apparatus, where the overlapping fields of view from multiple lenses (e.g., fisheye lenses) are mapped. The calibration process identifies the stitch line—the line or area where the two distinct fields of view overlap—and establishes the precise pixel coordinates along this line. As such, the ring grids can be obtained without processing the image data.

To restate, the ring grid coordinates are used in identifying overlapping bands of the front and back sensors of the image capture apparatus. The overlapping bands, where both sensors capture the same part of the scene, are then used in estimating flare since they provide a reference to determine the variance caused by the flare. The ring grid coordinates represent the pixel coordinates of this overlapping region. The ring grid coordinates are provided with respect to raw images. The ring grid coordinates, used with respect to the downscaled images, may not be precise at least because at least because the refinement necessary for precise stitching is performed by a stitching algorithm, which adjusts the grid for a perfect match by computing the disparity between lenses. The stitching algorithm is applied at a later stage in the image processing pipeline, meaning that access to it is not available early in the pipeline, resulting in grids with lesser precision. However, the coordinates are still precise, particularly for objects at an infinite distance from the lens, due to calibration. The stitching algorithm attempts to adjust the grids for objects closer than infinite distance, considering the disparity. However, the lesser precision, and as becomes clear from the description herein, is sufficient for the intended purpose of flare estimation using the overlapping bands.

There are several factors that necessitate the avoidance of extracting the overlapping bands directly from full raw fisheye images. Firstly, these images are typically of substantial size, which poses a challenge for efficient processing. Additionally, the alignment of ring grid coordinates, approximating a circular form, complicates the extraction and interpolation of values due to its lack of cache-friendliness, making it particularly challenging to utilize efficient processing techniques. Moreover, at this stage in the image processing pipeline (i.e., when the technique 1100 is applied), the images are often in a packed and/or compressed state, especially in video formats. This compression significantly increases the difficulty and time required to access individual pixels within the images. Moreover, from a signal processing perspective, the raw images may contain noise, potentially leading to a significantly noisy interpolation profile, especially due to high-frequency variations along the stitch line. In contrast, the statistics (i.e., downscaled images) exhibit reduced noise as they are calculated using averages across distinct sub-windows. Consequently, this results in the profile being computed over lower frequency variations along the stitch line, thus expected to be less noisy. Due at least to these reasons, it is more practical and efficient to extract the bands from the statistical data (i.e., the downscaled images) derived from the images, rather than directly from the full raw fisheye images themselves.

While it would be more precise to extract the overlapping bands directly from the raw fisheye images, in some implementations, the overlapping bands can be obtained directly from the downscaled images (i.e., from the 48×64 AWB statistics). As the downscaled images are not squared, a ratio must be applied to the ring grids before being extracted.

To obtain each of the overlapping bands from a corresponding image, an interpolation algorithm is typically used to calculate the color values of new, fewer pixels by effectively averaging and merging the colors of the original, numerous pixels. In an example, a nearest neighbor interpolation can be used. In another example, a bicubic interpolation can be used, which produces smoother gradations and sharper details. Bicubic interpolation may operate by considering a grid of 16 pixels (a 4×4 neighborhood) around each target pixel and calculating its value based on a weighted average. Bicubic interpolation may result in less noisy downscaled images than other interpolation techniques.

Figure 14:
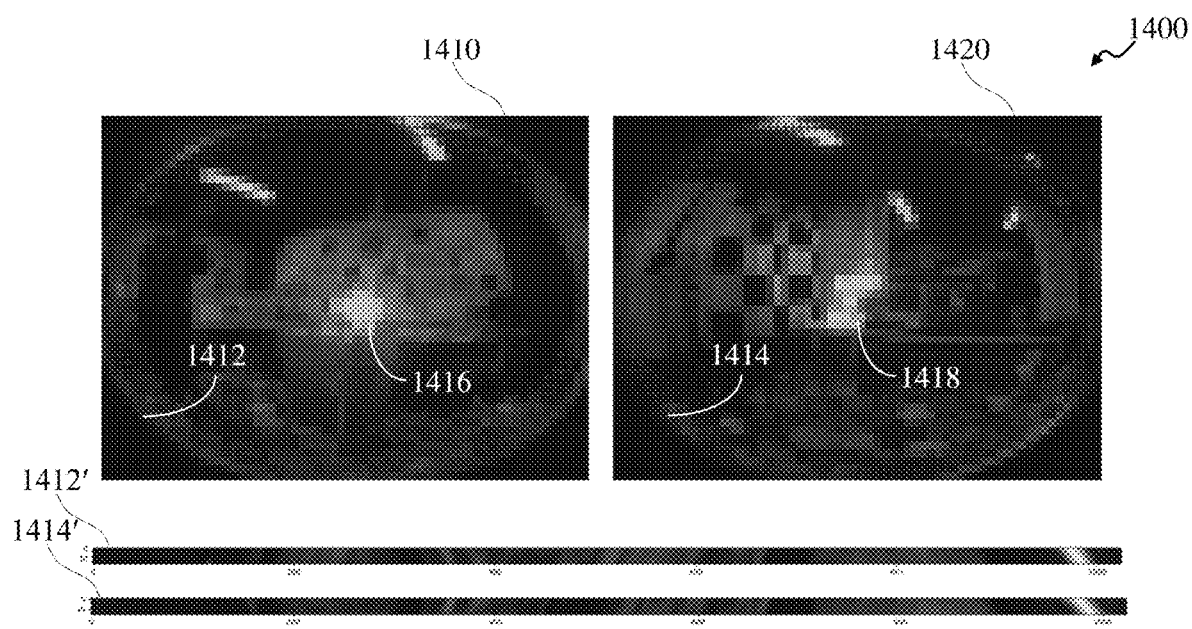
FIG. 14 illustrates an example of downscaled images.

FIG. 14 illustrates an example 1400 of downscaled images. The example 1400 includes a downscaled image 1410 (which may correspond to a back image obtained by a back sensor of an image capture apparatus) and a downscaled image 1420 (which may correspond to a front image obtained by a front sensor of the image capture apparatus). The example 1400 illustrates overlapping bands 1412 and 1414 of the downscaled images 1410 and 1420, respectively. The source of flare is shown by patches 1416 and 1418. Flattened bands 1412' and 1414' correspond, respectively, to the overlapping bands 1412 and 1414.

Referring again to FIG. 11, at 1130, the overlapping bands are reduced to one-dimensional (1D) lines. Each overlapping band is simplified to a 1D line for each color component (red, green, and blue channels). The 1D line is or represents the precise position of the stitch line, at 180° for each lens. This simplification enables more manageable analysis of the flare in each color channel, as it reduces the complexity of the data while retaining the essential information required for flare estimation.

Again, for each color component, one 1D line is obtained. Each overlap band may include 16×1024 pixels: 1024 pixel coordinates over the stitch line (e.g., around the band) and 16 pixels for the height of the band. Having 16 points per radius and approximately 8 radii (4 color components and 2 images) per pixel would result in 16*1024=16384 interpolations, which is undesirable. Additionally, when extracting bands directly from the 48×64 downscaled images, the high density of the coordinates relative to the very low resolution of the downscaled images presents a challenge. To address this an averaging techniques of each radius can be used to reduce the number of interpolation points from 16,384 to a significantly lower number.

In an example, each 16 pixels (on the height of a band) are averaged to obtain on pixel value representative of the 16 pixels. In an example, the barycenter can be used. That is, for each radius, the barycenter is calculated, therewith reducing the number of interpolations by 16 while not impacting the quality of the delta and/or offset (further described below) on which the flare is estimated. In yet another example, the stitch line position can be interpolated at 180°. By defining 16 lines in the range of 178° to 189°, the location of the stitch line can be identified between the 13th and 14th lines. This more precise determination of the stitch line position can enhance the accuracy of the interpolation.

Transitioning from a 16×1024 data format to a 1×1024 format has demonstrated effective results. Yet, it's worth noting that, on average, this approach involves interpolating 8 points over a single pixel in the downscaled image. This observation raises the possibility that a further reduction in the number of points could still yield adequate performance. As such, in an example, the number of points on each 1D line can be further reduced via decimation. Decimation significantly reduces the number of data points that need to be processed. By selecting a subset of points from the original high-density data set (derived from the 48×64 downscaled images of the raw images), flare estimation can operate on a smaller, more manageable set of data points. This reduction in data volume directly translates to lower computational requirements, making the algorithm more efficient and faster in processing.

While any decimation technique can be used, two decimation techniques are described herein: pure decimation and decimation by averaging. In pure decimation, every Nth point is retained, exemplified by a 1×512 dimension achieved by keeping one out of every two points in the barycenter of an overlapping band, effectively halving the data points. Decimation by averaging involves grouping N points and calculating their average. To illustrate, and assuming N=4, then each 1×1024 1D line can be regrouped into 1×4×256 data set where each 4 points in a set are averaged, therewith resulting in 1D lines of size 1×256.

At 1140, the 1d lines data are adjusted based on the LEC and the ACLS. The LEC accounts for exposure differences between the front and back sensors. As such, adjusting based on the LEC can be useful in ensuring that the flare estimation is not skewed by variations in sensor exposure. The ACLS adjustment accounts for correcting chrominance lens shading, which can affect color balance and accuracy in images. Thus, adjusting the flare based on the LEC and ACLS can be useful in accurately reflecting the impact of the flare on both the luminance and the chrominance data of the images, therewith resulting in a more precise estimation of flare across different color channels. Additionally, as the ISP 620 of FIG. 6 may also perform LEC and ACLS corrections, adjusting the flare algorithm to account for the effects of LEC and ACLS can avoid attributing differences in flare to these factors, therewith preventing potential double correction—once through the flare correction technique and once through the LEC/ACLS algorithm, as LEC and ACLS corrections occur subsequently in the ISP 620 pipeline.

The LEC may be stored within the image capture device as a lookup table (LUT). A respective LUT may be associated with each of the front and back lenses. The data in the LUT may be organized in a radial format, aligning the central point of an image with the initial entry in the LUT. Correspondingly, the data relevant to the outermost radius, which aligns with the stitch line, may be positioned at the end of the LUT. However, other arrangements of the LEC are possible. An LEC may include an analog gain value, the exposure time value, and the luminance lens shading (LLS). The LLS is similar to the ACLS. The LLC is a radial correction applied to a raw image for pixels at the extremity of the image, which are darker than those in the center. The LLS can be stored as a LUT and the last values in the of the LUT for each lens are used.

An LEC ratio (r) is calculated according to equation (1). Where $L_F[MAX-1]$ and $L_B[MAX]$ correspond to the LEC LUT associated with the stich line (e.g., the furthest distances to the center of the fisheyes) for the front and the back lenses, respectively. Assuming that the LUT includes 1024 entries, the (MAX−1) can be 1024 (assuming that the first entry of the LUT is indexed with 0). An appropriate compensation is applied based on the ratio. The ratio is used in determining which of the front sensor (i.e., the image from the front sensor) or the back sensor (i.e., the image from the back sensor) requires more compensation.

$$r = \frac{L_F[MAX-1]}{L_B[MAX-1]} \quad (1)$$

Given the multiplicative nature of the LEC LUT, if the LEC ratio (r) exceeds 1, then an adjustment is applied to the image obtained from the front sensor. Conversely, if the LEC ratio (r) is less than or equal to 1, the inverse of this ratio is applied to the back sensor (i.e., to the image obtained from the back sensor) for compensation. Applying the ratio to a sensor means multiplying the ratio by each value of each 1D line associated with the sensor.

The ACLS data may be stored as two-dimensional radial maps. These maps are applied to the red (R) and blue (B) color channels separately. Each of the front sensor and the back sensor may be associated with a respective unique map for each color channel, resulting in a total of four maps (two for each sensor). The maximum value from each of the maps is selected since the ACLS correction is more intense near the stitch line, which is the peripheral area of the fisheye lens's field corresponding to the overlapping bands (and, correspondingly the 1D derived lines). In another example, a profile at the stitch line position can be extracted for each CLS map, following the same procedure as used with the RGB stats to obtain the profile. Subsequently, the obtained profiles are averaged, resulting in a single value per map and per channel. The relevant ratio is then computed using these values.

To adjust the 1D lines corresponding to the front or the back sensor based on the ACLS, the maximum ACLS values between the back and front sensors are compared. This comparison involves a ratio calculation. For instance, in the context of the red channel of the back sensor, the 1D lines are adjusted by dividing each of their values by the value obtained using equation (2), where $A_B$ and $A_F$ are, respectively, the maximum value of the red ACLS map associated with the back sensor and the maximum value of the red ACLS map associated with the front sensor.

$$val_{red} = \max\left\{1, \frac{A_B}{A_F}\right\} \quad (2)$$

The ratio $A_B/A_F$ indicates that if the data corresponding to the back sensor is to be compensated more than the data associated with the front sensor, then the data associated with the front sensor is divided by the ratio.

At 1150, a global flare value is obtained for each color channel. The global flare values can be obtained by analyzing the offsets (e.g., differences) between corresponding front and back 1D lines. That is, to obtain a red flare value, the 1D lines corresponding to the red channel are used. Essentially, the process involves eliminating outliers and retaining valid points. The end result is a single, representative flare value for each color channel. Any technique for outlier removal, such as the Random Sample Consensus (RANSAC) algorithm or other suitable statistical techniques, can be used for isolating valid pixel data in the context of flare correction.

In an implementation, the following can be performed for each of the color channels. An offset between two corresponding 1D lines (e.g., the 1D lines corresponding to the blue color channel) from front and back sensors are obtained. The offset is defined as the set of pair-wise value differences between the 1D lines of the front sensor and the back sensor. Ideally, this offset, if plotted, should approximate a flat line, representing the flare value. However, due to inherent disparities in the overlapping bands of sensor data, the offsets typically present a profile comprising both flat areas and areas with significant variations. The flat areas correspond of the same portions of the scene imaged via both lenses. As such, the flat areas correspond only to differences due to the flare. The areas with significant variations correspond to or are due to different portions of the same being imaged via both lenses. Additionally, the ring grids can be considered to be accurate only for objects at an infinite distance (such as the sky). Thus, any imaged objects that are closer to the image capture apparatus (or objects that are not sufficiently homogeneous, such as ceilings or walls) will provide large variations.

To refine the offsets and isolate (e.g., retain) valid pixel data, an iterative statistical approach can be employed. Initially, the mean (average) value of all pixel data in the offsets is calculated, followed by the computation of the standard deviation of these values. Offsets that deviate from the mean by more than the calculated standard deviation are identified as outliers and are subsequently excluded from consideration. This process is repeated iteratively on the resulting subset of offsets, with each iteration further refining the remaining offsets by removing additional outliers. The iterations continue until a dataset comprising only valid points—those whose deviation from the mean is less than the standard deviation—is obtained, with a typical iteration limit set at a maximum of 20.

At the end of the iterative process, for each color component of the front and back 1D lines, a set of pixel values remain. As such, there can be a total of 3 data sets—one data set for each of the red, blue, and green color channels. Each of the offsets in a dataset is associated with an index. In an example, the remaining offsets are further merged. Merging the offsets sets can mean that unless an index is included in at least two (e.g., each) of the data sets associated with the red, green, and blue channels, that index (and the corresponding offset value) is removed from the data set.

A flare value for a color channel can then be obtained based on a metric associated with the corresponding data set (e.g., the remaining offset values). In an example, the metric can be the average. In an example, the metric can be the median. As mentioned above, the data in the data sets are offsets (differences) between the front and back image data. As such, a positive flare value can be due to the front lens, and will accordingly be removed from the raw image obtained from the front lens; and a negative flare value can be due to the back lens, and will accordingly be added (since the value is negative) to the raw image obtained from the back lens. The flare values may be stored in a variable, flareBands[2][3], where the first dimension may be associated with a lens (e.g., 0=front, 1=back) and the second dimension may be associated with a color component (e.g., 0=red, 1=green, and 2=blue).

As described above, the flare is estimated over RGB statistics (i.e., downscaled images). As such, only one flare value for the green is estimated. However, as further described herein, the flare is compensated over raw images, which have two green channels (i.e., namely, Gr and Gb). In an example, the flare value over the green channel can be duplicated and reused for both the Gr and Gb channels of the raw image.

FIG. 12 is a flowchart of a technique 1200 for adjusting flare values. Any number of adjustments can optionally be made to the flare values obtained using the technique 1100. At 1210, zero or more magnitude adjustments may be performed on the flare values. At 1220, zero or more adjustments based on color ratios may be performed on the flare values.

The magnitude adjustments may include an adjustment based on dark corners 1210_2, an adjustment based on gain and exposure 1210_4, and/or an adjustment based on percentile 1210_6. The color ratio adjustments can include an adjustment based on dark corners 1220_2 and/or an adjustment based on the white balance scales 1220_4. Those adjustments performed at 1210 will impact the magnitudes of the flare values. That is, all of the flare values associated with the color channels may be modified proportionally. Contrastingly, the color ratio adjustments (i.e., the adjustments performed at 1220) may modify the G/R (i.e., the estimated flare for the green channel over the estimated flare for the red channel) and/or G/B (i.e., the estimated flare for the green channel over the estimated flare for the blue channel) ratios of the estimated flare values. To be more specific, while the color ratio adjustments are based over G/R and G/B ratios, color ratio adjustments modify only the R (or B) channel data based on the adjusted G/R (or G/B) ratio and the original G channel values.

With respect to the adjustment based on dark corners 1210_2, each of the dark corners of each image are analyzed. Dark corners are areas of a camera sensor that are outside the fisheye projection disk, such as described with respect to FIG. 15. The dark corners can be useful in estimating flare values at least because any content in a dark corner is independent from the content of the image associated with the dark corner. Without any flare, a dark corner includes only noise the average of which is the black point value; and the flare directly impacts a dark corner by overflowing the image circle. Additionally, adjusting a flare value based on the dark corners can be useful when the flare value is small, in which case estimating the flare value may be noisy. As such, since the dark corners are expected to have minimal light interaction, any significant deviation in their pixel values from expected levels can be attributed to flare. Said another way, apart from the black point, dark corners should only contain information about the flare.

Each of the four dark corners of an image are analyzed separately. In this context, a dark corner of an image should be understood to mean the portion of the downscaled image corresponding to the original image. A median (or average) can then be computed per corner and per color channel. The median values can be stored in a variable labeled flareCorners[2][3][4], where the first dimension can correspond to an image (e.g., front or back), the second dimension corresponds to a color channel (red, green, or blue), and the third dimension corresponds to a corner (e.g., top-left, top-right, bottom-right, or bottom-left). The flareCorners values are compared to the corresponding flare values stored in flareBands (i.e., the flare values estimated over the overlapping bands). The comparison may result in a sign adjustment or a ratio adjustment, as further described below.

Sign adjustment can be useful particularly for small values of flare where the certainty of results stored in flareBands may be questionable. To address this, the sign of a flare value (e.g., flareBands[i][j]) is compared with the signs obtained from the dark corners (e.g., compared to the signs of all of flareCorners[i][j][*]) of the image. The rationale behind this comparison is the assumption that, while the magnitude of flare values from dark corners might be inaccurate, their sign (positive or negative) is likely to be reliable. Therefore, an average sign is computed by summing up the signs of flare across all channels, including flareBands and the four flareCorners.

This summation leads to three possible scenarios: firstly, if all signs are coherent (referred to as case 1), it indicates that the sign of the flareBands[i][j] value is reliable and flareBands[i][j] will be adjusted based on a ratio adjustment, as described below. Secondly, in cases of non-coherent signs (referred to as case 2) with at least two of the flareCorners[i][j][*] differing from the majority, it is likely that the flare is minimal. In such cases, the smallest of the five values (flareBands[i][j] and the four flareCorners[i][j][4]) is chosen. That is, flareBands[i][j] can be set to the minimal value. Thirdly, if the signs from the corners are coherent but differ from that of the value stored in the flareBands (referred to as case 3), it suggests that the value in the flareBands may not be reliable. In this situation, the smallest flare value from the flareCorners is selected and adjusted based on a ratio that is estimated from the flareBands.

Ratio adjustment is linked with the sign adjustment and is relevant in case 1 and in case 3: when all signs are coherent, and when the corner signs are coherent but differ from that stored in the variable flareBands. Ratio adjustment can be used to reduce the estimated flare, due to over-estimation from noisy inputs. Ratio adjustment involves calculating ratios as the division of the absolute values of one flare value by another. The ratio can be calculated essentially as flareBands/flareCorner (in case 1) or flareCorner/flareBands (in case 3). This adjustment is designed to mitigate the over-estimation of flare due to noisy inputs, ensuring that the flare values are reduced to a more accurate level. The smallest flare is defined as the one with the smallest sum of absolute values across channels.

For each color channel, a respective ratio can be computed as follows: four (corresponding to the four corners) separate ratios are computed by dividing the absolute value of one flare by the other, retaining only non-null ratios. If no valid ratios exist, the ratio is assumed to be 1.0. However, if valid ratios are present, the ratio is set to the median of these ratios, provided they are smaller than one; otherwise, the ratio is set to 1.0. In case 1, for each image x, and color channel y, the four ratios are abs (flareBands[x][y]/flareCorner [x][y][i]), for i=1 to 4; and in case 3, the ratios are abs (flareCorner [x][y][i]/flareBands[x][y]), for i=1 to 4.

The corresponding flare estimate is then adjusted (e.g., multiplied by) the calculated ratio.

With respect to the adjustment based on the gain and exposure 1210_4, this adjustment addresses the differences in sensor sensitivity and exposure settings, which can significantly affect how flare manifests across the images.

Sensors with varying sensitivities to light can respond differently to flare, leading to inconsistencies in flare representation. By accounting for these variations, the flare effect can be normalized across different sensor regions, ensuring a uniform flare correction throughout the image. This step also involves calibrating the flare adjustment to the specific exposure settings used during image capture. Exposure levels can influence the brightness and contrast of an image, and thus the visibility and impact of flare. By incorporating exposure data into the flare adjustment process, the adjustment compensates for any exposure-induced variations in flare appearance. This results in a balanced and realistic image, where the flare correction is seamlessly integrated into the image's overall exposure profile. Table I illustrate a pseudocode for adjustment based on the gain and exposure.

TABLE I

```
# Extract information
evFrnt =
    shootingParams.front.analogGain *
    shootingParams.front.expoTime
evBack =
    shootingParams.back.analogGain *
    shootingParams.back.expoTime
ratioFrnt = max(1,evFrnt/evBack)
ratioBack = max(1,evBack/evFrnt)
# Adjust flare accordingly
return np.array( [f / ratioFrnt if f > 0 else f / ratioBack for f in flare] )
```

The exposure values for the front and back sensors of the image capture apparatus are calculated. These exposure values, evFrnt and evBack, are determined by multiplying the analog gain (obtained from the LEC) with the exposure time for each respective sensor. Specifically, evFrnt is computed using the analog gain of the front sensor (shootingParams.front.analogGain) and exposure time (shootingParams.front.expoTime), and similarly, evBack is calculated using the corresponding parameters of the back sensor.

Following the calculation of the exposure values, the ratios used for adjusting the flare are computed. The ratio for the front sensor, ratioFrnt, is the greater of 1 or the quotient of evFrnt divided by evBack. Conversely, the ratio for the back sensor, ratioBack, is the greater of 1 or the quotient of evBack divided by evFrnt. These ratios are used in the subsequent step, where each flare value in the array flare is adjusted based on its sign. If a flare value is positive, indicating a more significant flare impact on the front sensor, it is divided by ratioFrnt. If it's not positive, implying a greater impact on the back sensor, it is divided by ratioBack. The adjusted flare values are then compiled into a new array, which the function returns.

With respect to the adjustment based on percentile 1210_6, this adjustment aims to avoid over-correction of flare, preventing excessive darkening of the image. This involves setting a threshold based on a predetermined percentile of pixel values within the image. By implementing this threshold, the adjustment ensures that only a specific portion of the pixels of an image, particularly those most impacted by the flare, are affected by the correction, while the rest of the image remains relatively unchanged. The choice of the percentile threshold can be determined by analyzing the distribution of pixel values in the image. Pixels falling below the flare value risk being set to black or near-black levels, potentially obliterating details and creating an unnatural appearance. The threshold can be set at a level where the flare adjustment does not disproportionately affect these lower-valued pixels, thus maintaining the overall integrity and natural appearance of the image, especially in darker regions.

The percentile adjustment can be empirically set at 3%. However, other percentile values are possible. The percentile adjustment can be used to ensure that the flare is reduced without excessively darkening more than a small proportion of the image. In an example, this adjustment is calculated only for the channel identified with the most intense flare (e.g., highest flare value magnitude amongst the flareBands values) and is based on the k-percentile $\tau_p$, estimated over the raw channel before applying black point (BP) and auto white balance (AWB) algorithms. A ratio r can be computed, using equation (3) as the minimum of and the k-percentile $\tau_p$ and the flare value f, divided by the flare value f. This ratio can be multiplicatively applied over all flare values. In some implementations, and particularly for firmware efficiency, the ratio can be calculated over the downsized image of dimension 48×64, which provides a sufficiently accurate estimation compared to using the whole image.

$$r = \frac{\min\{\tau_p, f\}}{f} \quad (3)$$

The percentile is not calculated over the entirety of the fisheye image; but rather on the inner-circle image. That is, the dark corners are not used in obtaining the percentile.

Color ratio adjustments, at 1220, can be useful in maintaining the original color fidelity in the images affected by luminance flare since the foregoing processing has been performed in the RGB space. Natural flare, such as that from the sun, predominantly manifests as luminance flare rather than chrominance flare. As such, it may be preferable, in flare correction, to give precedence to luminance while minimizing the impact on chrominance akin to white balance techniques, where the goal is to maintain the inherent color ratios of an image while correcting for lighting irregularities.

Since, as described above, the flare components in the R, G, and B channels are treated independently, such independent treatment may lead to disproportionate alterations in the G/R and G/B ratios, which are critical for preserving the original color fidelity of the image. For instance, an imbalance in these ratios can cause unnatural color shifts in an image after flare correction. This is especially the case when white balance is estimated before flare. If a colored flare (e.g., an estimated flare on one of the color channels) is small enough, the flare will be compensated by the white balance algorithm. Thus, if the flare correction also compensates (e.g., corrects) the flare, then the flare will be compensated twice (e.g., by the flare techniques described herein and then by the AWB), which will results in false colors in the final image. If AWB is corrected after the flare, then color ratio adjustments, at 1220, would not be necessary.

As such, the color ratio adjustments, at 1220, can be used to recalibrate the G/R and G/B ratios therewith ensuring that the color balance is maintained after flare correction, preventing the introduction of artificial color biases, and preserving the original color integrity of the image.

With respect to the adjustment based on dark corners 1220_2, this adjustment calculates the color ratios G/R and G/B and adjusts the ratios to maintain consistency after flare correction. For each of the four corners of the image, as well as for the current flare estimation, G/R and G/B ratios are estimated. If the current flare ratios diverge from the ratios obtained from the corners, an adjustment is made to align them. The consistencies of these ratios are determined by the absolute differences between the current flare ratio (G/R or G/B) and the average ratios from the four corners, as represented by equations (4) and (5). Equation (4) is used to calculate the consistency $c_r$ of the G/R ratio and equation (5) is used to calculate the consistency $c_b$ of the G/B ratio. In equations (4) and (5), $c^i{}_R$, $c^i{}_G$, and $c^i{}_B$ are the flare estimates from flareCorners at the $i^{th}$ corner for the red, green, and blue channels, respectively; and $f_R$, $f_G$, and $f_B$ are the flare estimates from flareBands.

$$c_r = \left| \frac{f_G}{f_R} - \frac{1}{4} \sum_i \frac{c^i_G}{c^i_R} \right| \quad (4)$$

$$c_b = \left| \frac{f_G}{f_B} - \frac{1}{4} \sum_i \frac{c^i_G}{c^i_B} \right| \quad (5)$$

The G/R consistency $c_r$ is then tested against the predetermined threshold $t_r$ given by equation (6); and the G/B consistency $c_b$ is then tested against the predetermined threshold $t_b$ given by equation (7), where the consistency constant $\tau_c$ can be empirically set to 1.5.

$$t_r = \tau_c \times std\left\{ \frac{c^i_G}{c^i_R} \right\}_{i \in [1,4]} \quad (6)$$

$$t_b = \tau_c \times std\left\{ \frac{c^i_G}{c^i_B} \right\}_{i \in [1,4]} \quad (7)$$

The reliability of the corner ratios for adjustment is based on their standard deviations. A small standard deviation indicates consistency among the corner ratios, rendering them trustworthy for use (e.g., usable) in flare ratio adjustment. Conversely, a large standard deviation suggests inconsistency and unreliability in the corner ratios. If a calculated consistency (e.g., $c_r$ or $c_b$) exceeds the corresponding threshold (e.g., $t_r$ or $t_b$), it indicates that the ratios from the four corners are coherent (with a low standard deviation) and that the ratio from the current flare does not align with those of the dark corners. In such cases, the corresponding flare (R or B) is adjusted according to one of the corresponding formulas (8) or (9), as the case may be.

$$\hat{f}_R = f_R \frac{f_G/f_R}{\frac{1}{4}\sum_i c^i_G/c^i_R} \quad (8)$$

$$\hat{f}_B = f_B \frac{f_G/f_B}{\frac{1}{4}\sum_i c^i_G/c^i_B} \quad (9)$$

With respect to the adjustment based on white balance scales 1220_4, this adjustment can address the color shifts in images, primarily caused by the flare estimated over RGB, not YUV, and the application of flare after the estimation of WB scales. This adjustment is based on the fact that most natural flare predominantly affects luminance with minimal impact on chrominance. The color ratios G/R and G/B are estimated for the current flare, both before and after the dark corners color ratio adjustment. If at least one of these ratios closely aligns with the estimated WB scale, the flare in the red (or blue) channel can be adjusted to match the WB scale derived from the green flare value.

With respect to the G/R ratio, the relative distance $d_R$ between the current $f_g/f_r$ (or corrected $f_g/\hat{f}_r$) flare ratio and the white balance scale $s_r$ can be calculated using formula (10); and the relative distance $d_B$ of the G/B ratio, using formula (11).

$$d_R = \left| \frac{\left|\frac{f_g}{f_r}\right| - s_r}{s_r} \right| \quad (10)$$

$$d_B = \left| \frac{\left|\frac{f_g}{f_b}\right| - s_b}{s_b} \right| \quad (11)$$

If a calculated distance falls below a set threshold (e.g., 15%), then the flare ratio is considered to closely match the WB scales. When flare ratios closely match the WB scales, it implies an adjustment focused on luminance, without altering chrominance. In the case of a close match, the flare is forced to align with the WB scale based on one of the formulas (12) (for the red flare) or (13) (for the blue flare) as the case may be:

$$\hat{f}_r = \frac{f_g}{s_r} \quad (12)$$

$$\hat{f}_b = \frac{f_g}{s_b} \quad (13)$$

Referring again to FIG. 10, and as mentioned above, in some implementations, correcting the flare, at 1030, can be or include correcting the flare while simultaneously preserving dark areas, at 1030_2. To preserve dark areas, a percentile adjustment is described above with respect to FIG. 12. While the adjustment effectively prevents black crush, it may result in inaccurate colors. In such cases, flare compensation can be slightly reduced, resulting in an improvement in false color representation. The preservation process is executed independently over each channel corrected from the flare.

To correct flare while preserving dark areas, a flare value is not uniformly subtracted from each pixel value of the raw image. Rather, pixel values are adjusted based on a function:

$$g(x) = \begin{cases} (x - f) & \text{if } x \text{ is in the range } (\gamma, 2^p - 1] \\ x^2(ax + b) & \text{if } x \text{ is in the range } [0, \gamma) \end{cases}$$

In the flare correction function $g(x)$, p is the image's precision (e.g., number of binary bits used to represent pixel values), $\gamma$ is a threshold pixel value that is a function of the corresponding flare value f. That is, $\gamma = \alpha f$, where $\alpha$ is greater than or equal to 2. The polynomial (i.e., $P(x) = x^2(ax+b)$) used in the range $[0, \gamma)$ can be designed to smoothly transition between 0 and the flare subtraction point. The polynomial can be such that $P(0)=0$ and $P'(0)=0$ therewith ensuring a smooth approach to zero, and $P(\gamma)=g(\gamma)=(\gamma-f)$ and $P'(\gamma)=1$ therewith guaranteeing a smooth transition to flare correction. These conditions yield the final flare correction function $g(x)$ of the form:

$$g(x) = \begin{cases} (x - f) & \text{if } x \text{ is in the range } (\gamma, 2^p - 1] \\ \left(\frac{x}{\gamma}\right)^2 \left(\frac{(2f - \gamma)}{\gamma} x + 2\gamma - 3f\right) & \text{if } x \text{ is in the range } [0, \gamma) \end{cases}$$

Figure 13:
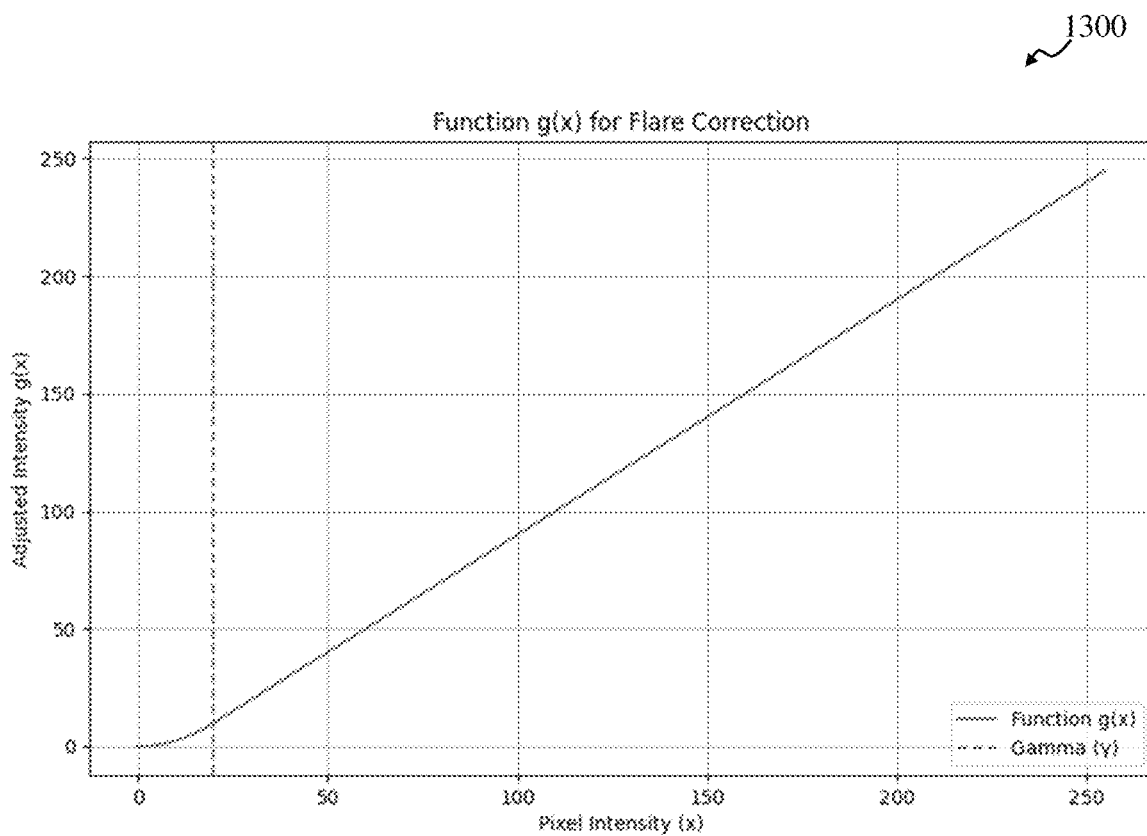
FIG. 13 illustrates a plot of an example of a flare correction function.

FIG. 13 illustrates a plot 1300 of an example of a flare correction function g(x). In the plot 1300, specific parameter values are assumed: the flare value f is set at 10, the threshold pixel value γ is set at 20, and the precision of the image, denoted by p, is considered to be 8-bit. The plot 1300 illustrates the behavior of the flare correction function g(x) across different pixel intensity ranges under these specified conditions.

To restate, subtracting the flare directly could lead to crushed colors in dark areas, where, for example, the blue channel might be reduced to zero while the green and red are not, causing a color shift. To mitigate this, instead of applying a linear subtraction function across all pixel intensities, a polynomial function is used for dark pixels. The function smoothly tapers to zero, preventing the crushing of all dark pixels to zero and thus preserving some values in these areas. As such, more accurate and natural colors can be maintained (e.g., preserved) in dark areas.

Figure 15:
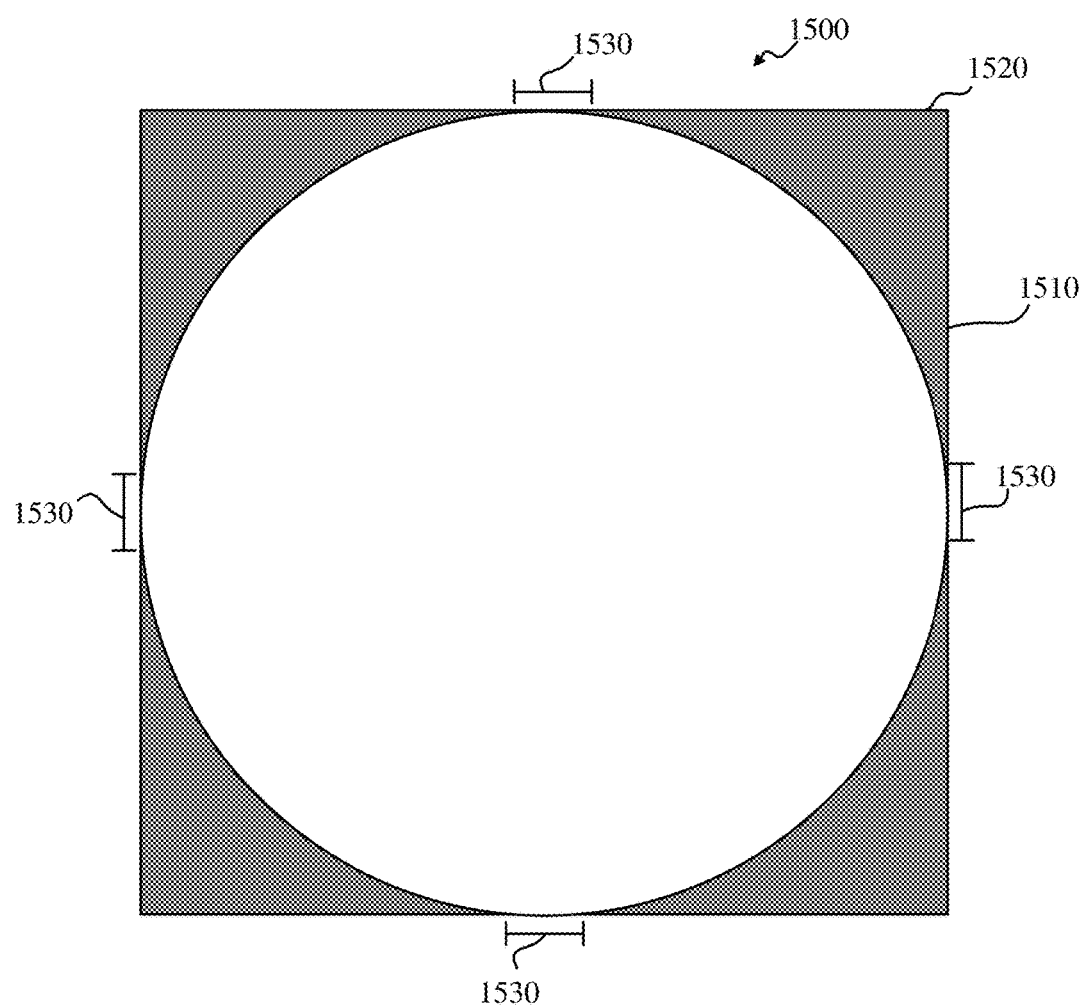
FIG. 15 is a diagram of an example of an image captured by an image capture apparatus.

FIG. 15 is a diagram of an example of an image 1500 captured by an image capture apparatus. As shown in FIG. 15, the image 1500 includes an image circle portion 1510 and dark corner areas 1520. The dark corner areas 1520 are areas along concentric circles measured outside the image circle portion 1510. The dark corner areas 1520 may not be available along the entire image border, resulting in gaps 1530 in areas along the image border. The gaps 1530 may be around areas where the image border is tangent to the image circle portion 1510.

Figure 16:
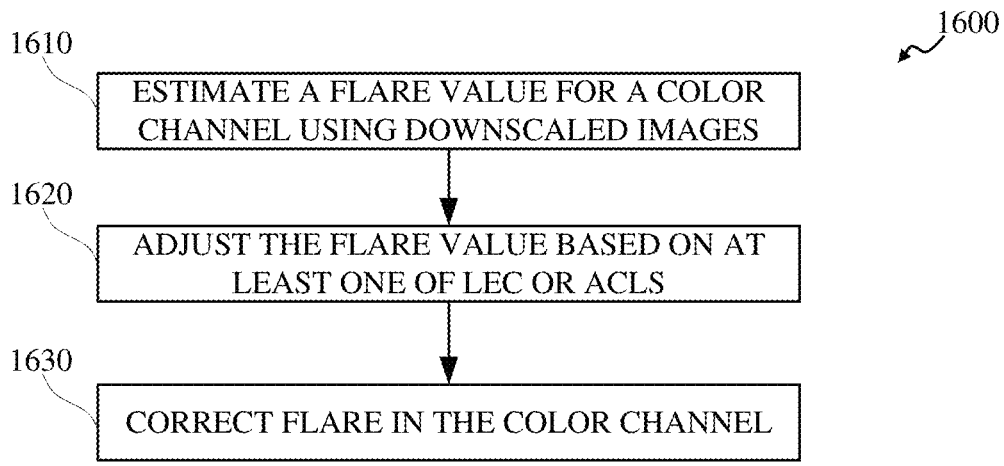
FIG. 16 is a flowchart of a technique for flare compensation.

To further describe some implementations in greater detail, reference is next made to examples of techniques which may be performed by or using an image capture apparatus to correct flare. FIG. 16 is a flowchart of a technique 1600 for flare compensation. The technique 1600 can be executed using computing devices, such as the systems, hardware, and software described with respect to FIGS. 1-15. The technique 1600 can be implemented in or by the ISP 620 of FIG. 6.

The technique 1600 can be implemented, for example, as a software program that may be executed by an image capture apparatus, such as the image capture apparatus 200 of FIGS. 2A-2B or the image capture apparatus 300 of FIG. 3. The software program can include machine-readable instructions that may be stored in a memory such as the storage 536 of FIG. 5 or a memory of the processing components 520 of FIG. 5, and that, when executed by a processor, such as a component of the processing components 520 of FIG. 5, may cause the image capture apparatus to perform the technique 1600. The technique 1600 can be implemented using specialized hardware or firmware. Multiple processors, memories, or both, may be used.

At 1602, a flare value for a color channel is estimated using downscaled images of images obtained via dual fisheye lenses. At 1604, the flare value is adjusted based on at least one of LEC) or ACLS data to obtain an adjusted flare value. Adjusting the flare value can include adjusting the flare value based on an analysis of dark corners of the downscaled images, as described above. For example, a sign of the flare value may be adjusted based on the analysis of the dark corners. The flare value can be further adjusted based on gain and exposure settings. In an example, the flare can be estimated after a white balancing operation of an image signal processing pipeline.

At 1606, a flare in the color channel of at least one of the images is corrected by combining the adjusted flare value with pixel values of the at least one of the images image. In an example, at least some pixels of the at least one of the images may be corrected based on a polynomial function, such as described above with respect to P(x). In an example, the color channel is a green color channel and the flare value is duplicated and reused for a Gr channel and a Gb channel of a raw image corresponding to the at least one of the images.

Figure 17:
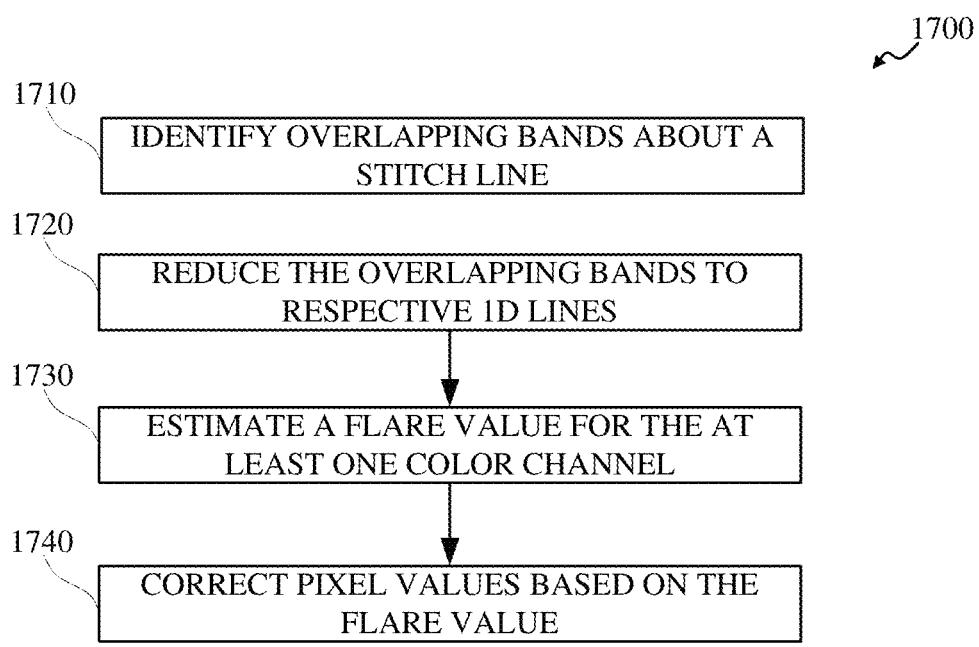
FIG. 17 is a flowchart of a technique for flare compensation.

FIG. 17 is a flowchart of a technique 1700 for flare compensation. The technique 1700 can be executed using computing devices, such as the systems, hardware, and software described with respect to FIGS. 1-15. The technique 1700 can be implemented in or by the ISP 620 of FIG. 6.

The technique 1700 can be implemented, for example, as a software program that may be executed by an image capture apparatus, such as the image capture apparatus 200 of FIGS. 2A-2B or the image capture apparatus 300 of FIG. 3. The software program can include machine-readable instructions that may be stored in a memory such as the storage 536 of FIG. 5 or a memory of the processing components 520 of FIG. 5, and that, when executed by a processor, such as a component of the processing components 520 of FIG. 5, may cause the image capture apparatus to perform the technique 1700. The technique 1700 can be implemented using specialized hardware or firmware. Multiple processors, memories, or both, may be used.

At 1710, overlapping bands about a stitch line between a first downscaled image of a first image and second downscaled image of a second image are identified based on ring grid coordinates. The overlapping bands include pixel values and, as described above, can each have a dimension of 1024×16. At 1720, the overlapping bands are reduced to respective one-dimensional lines of pixel values for at least one color channel. Reducing each overlapping band to a 1D line can include decimating the 1D line to reduce the number of data points in the 1D line.

At 1740, a flare value is estimated for the at least one color channel based on offsets (e.g., differences) between corresponding pixel values of the respective one-dimensional lines. In an example, the flare value can be adjusted based on LEC or ACLS data. In an example, the flare value can be adjusted based on a comparison with dark corner values. In an example, the flare value can be adjusted based on respective signs of respective flare estimates of dark corners.

At 1760, pixel values of the at least one color channel of a raw image corresponding to one of the first downscaled image or the second downscaled image based on the flare value are corrected. The at least one color channel can be the green color channel and the flare value can be duplicated and reused for the Gr channel and the Gb channel of the raw image.

The technique 1700 may further include preserving details in dark areas of the raw image during flare correction by applying a polynomial function to pixel values within a specific range, where the polynomial function is designed to smoothly transition between zero and the flare value.

In another implementation of flare compensation, respective flare values for color channels are estimated using downscaled images obtained from a white balancing step of an image signal processing pipeline. At least one of the respective flare values is adjusted based on LEC or ACLS data to obtain an respective adjusted flare values. Flare in at least one of the color channels is corrected based on a corresponding adjusted flare value of the respective adjusted flare values by combining the corresponding adjusted flare value with pixel values of a raw image corresponding to at least one of the downscaled images.

The methods and techniques of flare compensation described herein, or aspects thereof, may be implemented by an image capture apparatus, or one or more components thereof, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, or the image capture apparatus 500 shown in FIG. 5. The methods and techniques of flare compensation described herein, or aspects thereof, may be implemented by an image capture device, such as the image capture device 104 shown in FIGS. 1A-1B, one or more of the image capture devices 204, 206 shown in FIGS. 2A-2B, one or more of the image capture devices 304, 306 shown in FIG. 3, the image capture device 404 shown in FIGS. 4A-4B, or an image capture device of the image capture apparatus 500 shown in FIG. 5. The methods and techniques of flare compensation described herein, or aspects thereof, may be implemented by an image processing pipeline, or one or more components thereof, such as the image processing pipeline 600 shown in FIG. 6.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   estimating a flare value for a color channel using downscaled images of images obtained via dual fisheye lenses;
   adjusting the flare value based on at least one of luminance exposure compensation (LEC) or automatic color lens shading (ACLS) data to obtain an adjusted flare value; and
   correcting a flare in the color channel of at least one of the images by combining the adjusted flare value with pixel values of the at least one of the images.

2. The method of claim 1, wherein adjusting the flare value further comprises:
   adjusting the flare value based on an analysis of dark corners of the downscaled images.

3. The method of claim 2, further comprising:
   adjusting a sign of the flare value based on the analysis of the dark corners.

4. The method of claim 1, wherein correcting the flare in the color channel of the at least one of the images comprises:
   correcting at least some pixels of the at least one of the images based on a polynomial function.

5. The method of claim 1, wherein the flare value is further adjusted based on gain and exposure settings.

6. The method of claim 1, wherein estimating the flare value is performed after a white balancing operation of an image signal processing pipeline.

7. The method of claim 1, wherein the color channel is a green color channel, and wherein the flare value is duplicated and reused for a Gr channel and a Gb channel of a raw image corresponding to the at least one of the images.

8. An apparatus, comprising:
   a processor configured to execute instructions to:
   identify overlapping bands about a stitch line between a first downscaled image of a first image and a second downscaled image of a second image based on ring grid coordinates;
   reduce the overlapping bands to respective one-dimensional lines of pixel values for at least one color channel;
   estimate a flare value for the at least one color channel based on offsets between corresponding pixel values of the respective one-dimensional lines; and
   correct pixel values of the at least one color channel of a raw image corresponding to one of the first downscaled image or the second downscaled image based on the flare value.

9. The apparatus of claim 8, wherein the flare value is adjusted based on luminance exposure compensation (LEC) or automatic color lens shading (ACLS) data.

10. The apparatus of claim 8, wherein to reduce the overlapping bands to the respective one-dimensional lines of the pixel values for the at least one color channel comprises to:
    decimate respective data points of the respective one-dimensional lines.

11. The apparatus of claim 8, wherein the processor is further configured to:
    adjust the flare value based on a comparison with dark corner values.

12. The apparatus of claim 8, wherein the processor is further configured to:
    adjust the flare value based on respective signs of respective flare estimates of dark corners.

13. The apparatus of claim 8, wherein the at least one color channel is a green color channel, and wherein the flare value is reused for a Gr channel and a Gb channel of the raw image.

14. The apparatus of claim 8, wherein the processor is further configured to:
    preserve details in dark areas of the raw image during flare correction by applying a polynomial function to pixel values within a specific range, where the polynomial function is designed to smoothly transition between zero and the flare value.

15. A non-transitory computer readable medium storing instructions operable to cause one or more processors to perform operations to:
    estimate respective flare values for color channels using downscaled images obtained from a white balancing step of an image signal processing pipeline;
    adjust one of the respective flare values based on at least one of luminance exposure compensation (LEC) or automatic color lens shading (ACLS) data to obtain respective adjusted flare values; and
    correct a flare in at least one of the color channels based on a corresponding adjusted flare value of the respective adjusted flare values by combining the corresponding adjusted flare value with pixel values of a raw image corresponding to at least one of the downscaled images.

16. The non-transitory computer readable medium of claim 15, wherein the respective flare values are estimated based on overlapping bands about a stitch line in the downscaled images.

17. The non-transitory computer readable medium of claim 15, wherein the one of the respective flare values are further adjusted based on an analysis of dark corners of the downscaled images.

18. The non-transitory computer readable medium of claim 15, wherein the flare is corrected based on a polynomial function applied to pixel values in dark areas of the raw image.

19. The non-transitory computer readable medium of claim 15, wherein to correct the flare comprises to:
recalibrate green-to-red (G/R) and green-to-blue (G/B) color ratios.

20. The non-transitory computer readable medium of claim 15, wherein at least one of the color channels is a green color channel, and wherein the corresponding adjusted flare value is reused for a Gr channel and a Gb channel of the raw image.

* * * * *